(12) United States Patent
Alfieri, III

(10) Patent No.: US 10,060,081 B2
(45) Date of Patent: Aug. 28, 2018

(54) EDGING SYSTEM FOR UNIT PAVEMENT SYSTEM

(71) Applicant: James A. Alfieri, III, Kirtland, OH (US)

(72) Inventor: James A. Alfieri, III, Kirtland, OH (US)

(*) Notice: Subject to any disclaimer, the term of this patent is extended or adjusted under 35 U.S.C. 154(b) by 0 days.

(21) Appl. No.: 15/078,467

(22) Filed: Mar. 23, 2016

(65) Prior Publication Data

US 2016/0222601 A1 Aug. 4, 2016

Related U.S. Application Data

(63) Continuation of application No. PCT/US2014/057586, filed on Sep. 26, 2014, which is a continuation-in-part of application No. 14/039,062, filed on Sep. 27, 2013, now Pat. No. 8,915,027.

(51) Int. Cl.
  *E01C 5/00* (2006.01)
  *E01C 11/22* (2006.01)
  *A01G 9/28* (2018.01)

(52) U.S. Cl.
  CPC .............. *E01C 11/221* (2013.01); *A01G 9/28* (2018.02)

(58) Field of Classification Search
  CPC ........................................................ E01C 11/00
  USPC ..................... 404/47, 68; 405/262; 52/102
  See application file for complete search history.

(56) References Cited

U.S. PATENT DOCUMENTS

| | | | |
|---|---|---|---|
| 1,226,149 A | | 5/1917 | Warmoth |
| 1,349,340 A | * | 8/1920 | Hotchkiss ............. E01C 19/502 |
| | | | 249/189 |
| 1,764,029 A | | 6/1930 | Miller |
| 2,330,214 A | * | 9/1943 | Heltzel ................. E01C 11/126 |
| | | | 404/51 |
| 3,429,241 A | | 2/1969 | Burton |
| 3,613,323 A | | 10/1971 | Hreha |
| 4,644,685 A | * | 2/1987 | Tisbo ....................... A01G 9/28 |
| | | | 47/33 |
| 4,710,062 A | | 12/1987 | Vidal et al. |
| 5,104,074 A | * | 4/1992 | Malloy ............... E04H 12/2215 |
| | | | 156/63 |

(Continued)

OTHER PUBLICATIONS

Olyola Edgings, Inc. website, General Tips https://www.olyola.com/edging-tips/.*

(Continued)

*Primary Examiner* — Thomas B Will
*Assistant Examiner* — Katherine J Chu
(74) *Attorney, Agent, or Firm* — Rankin, Hill & Clark LLP

(57) ABSTRACT

A method of installing an edging system for a unit pavement system includes positioning a paver-contacting surface of an edge restraint against an edge of a unit pavement system including a plurality of paver units, and driving a horizontal stake in a generally horizontal direction underneath at least one paver unit of the plurality of paver units and into a granular material layer upon which the unit pavement system is supported such that the horizontal stake is operatively connected with the edge restraint. The edge restraint includes a horizontal section and a vertical section joined at a corner. The vertical section extends upwardly from and generally perpendicular to the horizontal section. An edging system for a unit pavement system is also disclosed.

18 Claims, 16 Drawing Sheets

(56) References Cited

U.S. PATENT DOCUMENTS

| | | | |
|---|---|---|---|
| 5,212,917 A | 5/1993 | Kurtz et al. | |
| 5,315,780 A * | 5/1994 | Thomas | A01G 1/08 47/33 |
| 5,640,801 A * | 6/1997 | Rynberk | A01G 1/08 404/7 |
| 5,993,107 A | 11/1999 | Bauer | |
| 6,099,201 A * | 8/2000 | Abbrancati | A01G 9/28 404/7 |
| 6,171,015 B1 | 1/2001 | Barth et al. | |
| 6,185,893 B1 | 2/2001 | Gaston | |
| 6,379,078 B1 | 4/2002 | Zwier | |
| 6,568,126 B2 * | 5/2003 | Womack | E02B 3/00 47/33 |
| 6,874,975 B2 | 4/2005 | Hilfiker et al. | |
| 7,051,477 B2 * | 5/2006 | Burnham | A01G 1/08 404/7 |
| 7,306,402 B2 * | 12/2007 | Graber | A01G 1/08 405/121 |
| 7,344,334 B2 | 3/2008 | Thorkelson | |
| D586,005 S | 2/2009 | Schumaker et al. | |
| 7,963,718 B2 | 6/2011 | Zwier et al. | |
| 7,967,524 B2 | 6/2011 | Jones | |
| 8,266,844 B2 | 9/2012 | Kurtz et al. | |
| 8,702,346 B2 * | 4/2014 | Meert | E02B 5/02 405/118 |
| 2008/0163566 A1 | 7/2008 | Bella | |
| 2009/0016849 A1 | 1/2009 | Riccobene et al. | |
| 2009/0304456 A1 | 12/2009 | Taylor et al. | |
| 2010/0121328 A1 | 5/2010 | Reitzig et al. | |
| 2011/0173901 A1 | 7/2011 | Runkles et al. | |
| 2017/0233972 A1 * | 8/2017 | Zhou | E02D 5/80 52/155 |

OTHER PUBLICATIONS

Olyola Edgings, Inc. website, Edging Install Basics https://www.olyola.com/install-lawn-edging/.*
International Search Report filed in PCT/US2014/057586 dated Jan. 5, 2015.

* cited by examiner

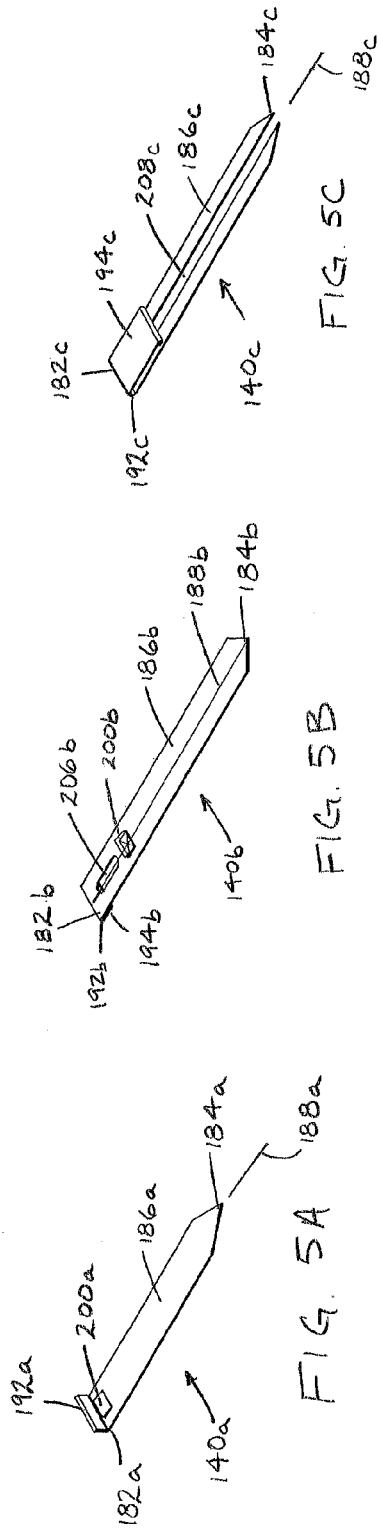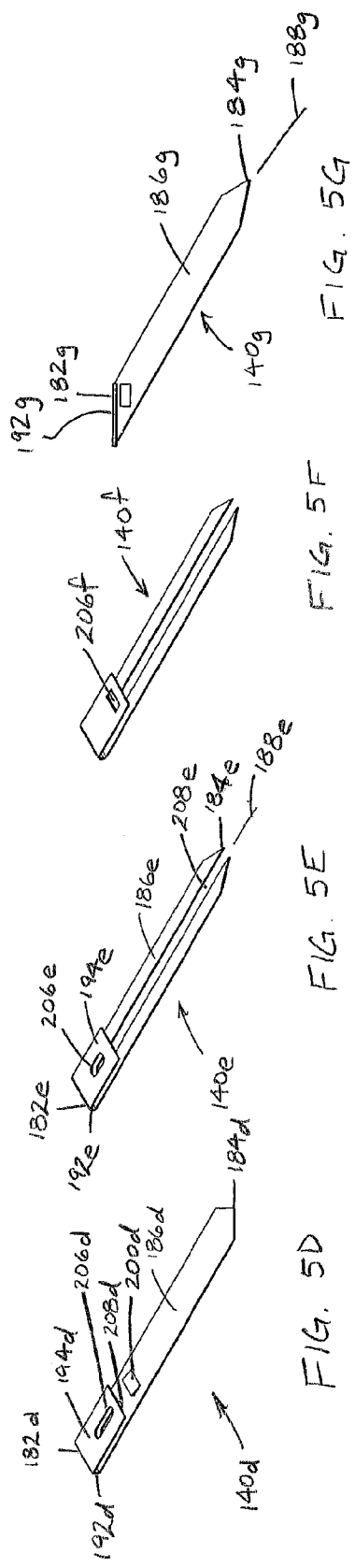

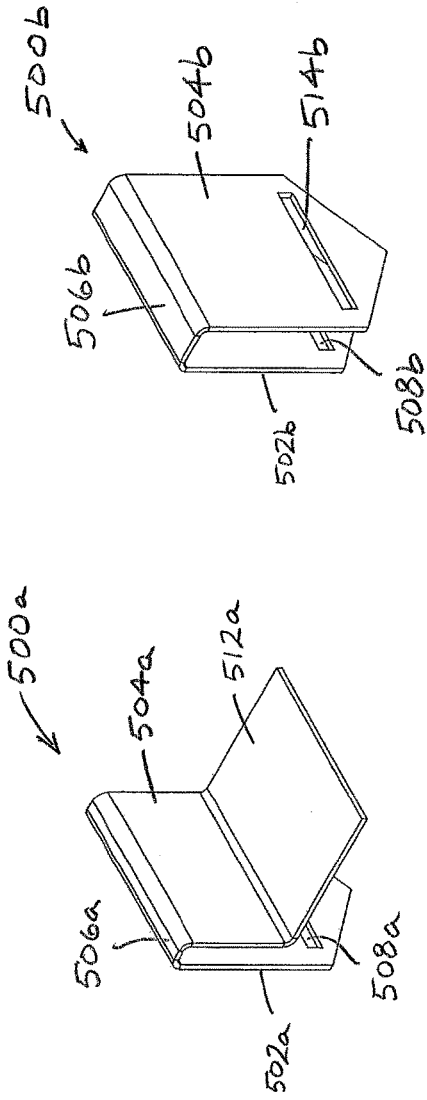
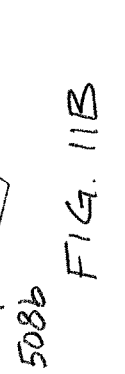
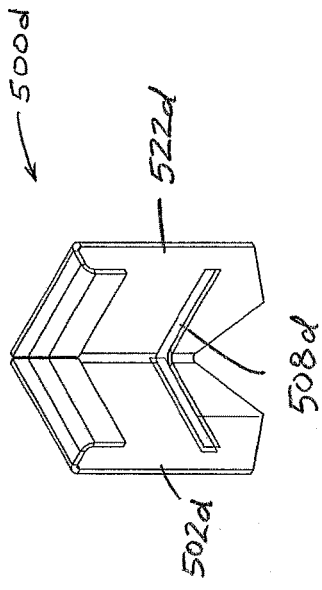
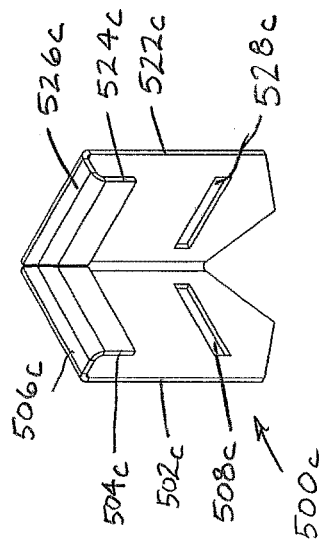

EDGING SYSTEM FOR UNIT PAVEMENT SYSTEM

BACKGROUND

Unit pavement systems are made up of a plurality of paver units laid on a granular material, e.g., sand or stone aggregate. The paver units are made individually or in combination from a variety of materials such as concrete, clay, natural stone, asphalt, or synthetic materials. An "L-type" edge restraint system is the most popular edge restraint system used in the horizontal surface installation of unit pavement systems. The responsibility of the edge restraint system is to prevent the paver units from horizontal movement over time.

The L-type edge restraint is primarily anchored by nails, spikes, stakes or screws driven through fastener openings provided in a horizontal section, also referred to as the base flange, of the edge restraint and then into the granular sub-base below. The sub-base upon which the unit pavement system and the L-type edge restraint is installed typically extends beyond the edge of the unit pavement system a distance equal to the installed base depth. This provides for load transfer, edge restraint stability, and a base structure to hold the anchoring fasteners in place. There are typically two different types of installation techniques used when installing L-type edge restraints.

The first and most common installation method is referred to as exterior base flange placement. In this method, the base flange, or horizontal section, is installed on the outside of the edge of the unit pavement surface. Ten-inch steel spikes are then driven through fastener openings in the base flange and into the sub-grade below. The number of spikes needed varies depending on the load of the unit pavement system after installation.

The exterior base flange placement installation method is most preferred by installers because it allows the installation of the unit pavement system to be completed prior to edge restraint placement. This installation method also allows for the popular "rip cut" that is typically used by installers for time savings. A "rip cut" is defined as a cutting process used by the installer whereby the paver units are overlaid past a finished line, marked, and then cut along the finished line using a portable hand saw to form a finished edge of the unit pavement system. By not having the edge restraint in place, the paver units do not have a specific tolerance to meet along the perimeter of the unit paving system. This process requires less time in cutting labor and allows for a variance in the finished pavement edges or perimeters that is not available with an interior flange placement method that is to be discussed below.

When the "L-type" edge restraint is installed using the exterior base flange placement method, the edge restraint typically moves from its original position over time. The edge restraint is held in place by the vertical force on the spike as the spike is engaged with the sub-base and the weight of any backfill material on the base flange. Snow, rain, ground movement, traffic load, erosion, frost and terrestrial sub-base composition force the edge restraint and the spike to move both vertically and horizontally out of place. This can result in the spike and the edge restraint separating from the sub-base. In other cases, the spike can separate from the edge restraint. When either case occurs, the final result is a failure of the "L-type" edge restraint to stay in place making the edge restraint less effective in holding the paver units in place.

The second installation method for use with the "L-type" edge restraint is referred to as the interior base flange placement. In this method, the base flange is installed facing toward the finished edge of the unit paving system. This installation is least preferred by installers because the edge restraint needs to be installed and anchored prior to the finished edge of the unit pavement system being installed. In this installation, the paver units must be individually cut and then placed in between the installed paver units and next to the vertical section of the already installed edge restraint. This method is much more time consuming than the exterior base flange placement method. The interior base flange placement method requires individually cutting paver units, precise measurement of edging placement, and results in additional labor time to fix units that do not line up with the edge restraint during installation.

With the interior base flange placement installation method, the weight of the paver units along the edge of the unit pavement system can help restrain the edge restraint from movement. One disadvantage with this method, however, is that the outer edges of the paver units along the edge of the unit pavement system sit on a different foundation structure, i.e., the base flange of the edge restraint, as compared to the remainder of the paver units along the edge, which sit on granular material. This causes the paver units along the edge to tip toward the interior of the unit pavement system. This tipping direction can cause water drainage issues because the free flow of water away from the unit pavement edge is impeded.

There is also another type of edge restraint generally referred to as a permeable pavement edge restraint. Permeable pavement edge restraints are primarily used for unit pavement systems that have a base composition made of larger aggregate materials having no small or fine particles. Such a base composition does not compact as densely as traditional aggregate. Since the material is open-graded and not finely compacted, the use of common fasteners, e.g., the 10-inch spike mentioned above, is unavailable because the common fasteners will not stay in place as they would in a traditional finer aggregate base. A geo-grid or base plate is typically installed on the sub-base prior to the unit pavers being installed. The permeable pavement edge restraints are then fastened to a capture plate or clip that holds the edge restraint to the geo-grid or base plate. Generally, this system requires additional labor and materials and is more costly than a typical L-type edge restraint system.

SUMMARY

In view of the foregoing, a method of installing an edging system for a unit pavement system includes positioning a paver-contacting surface of an edge restraint against an edge of a unit pavement system including a plurality of paver units, and driving a stake in a generally horizontal direction underneath at least one paver unit of the plurality of paver units and into a granular material layer upon which the unit pavement system is supported such that the stake is operatively connected with the edge restraint. The edge restraint includes a horizontal section and a vertical section joined at a corner. The vertical section defines the paver-contacting surface and extends upwardly from and generally perpendicular to the horizontal section.

An edging system for a unit pavement system includes an edge restraint and a stake operatively connected with the edge restraint. The edge restraint includes a horizontal section and a vertical section joined at a corner. The vertical section extends upwardly from and generally perpendicular to the horizontal section and defines a paver-contacting surface configured to contact an edge of the unit pavement system. The stake operatively connects with the edge restraint adjacent to and slightly offset from the corner of the edge restraint. The stake is sufficiently rigid so as to be driven into coarse sand with a hammer underneath paver units of the unit pavement system. The stake includes a substantially horizontally disposed portion extending away from the paver-contacting surface of the edge restraint and underneath paver units of the unit pavement system.

BRIEF DESCRIPTION OF THE DRAWINGS

FIGS. 5A-5G are perspective views of alternative horizontal stakes for edging systems.

FIGS. 11A-11D are perspective views of alternative clips for edging systems.

DETAILED DESCRIPTION

Figure 1:
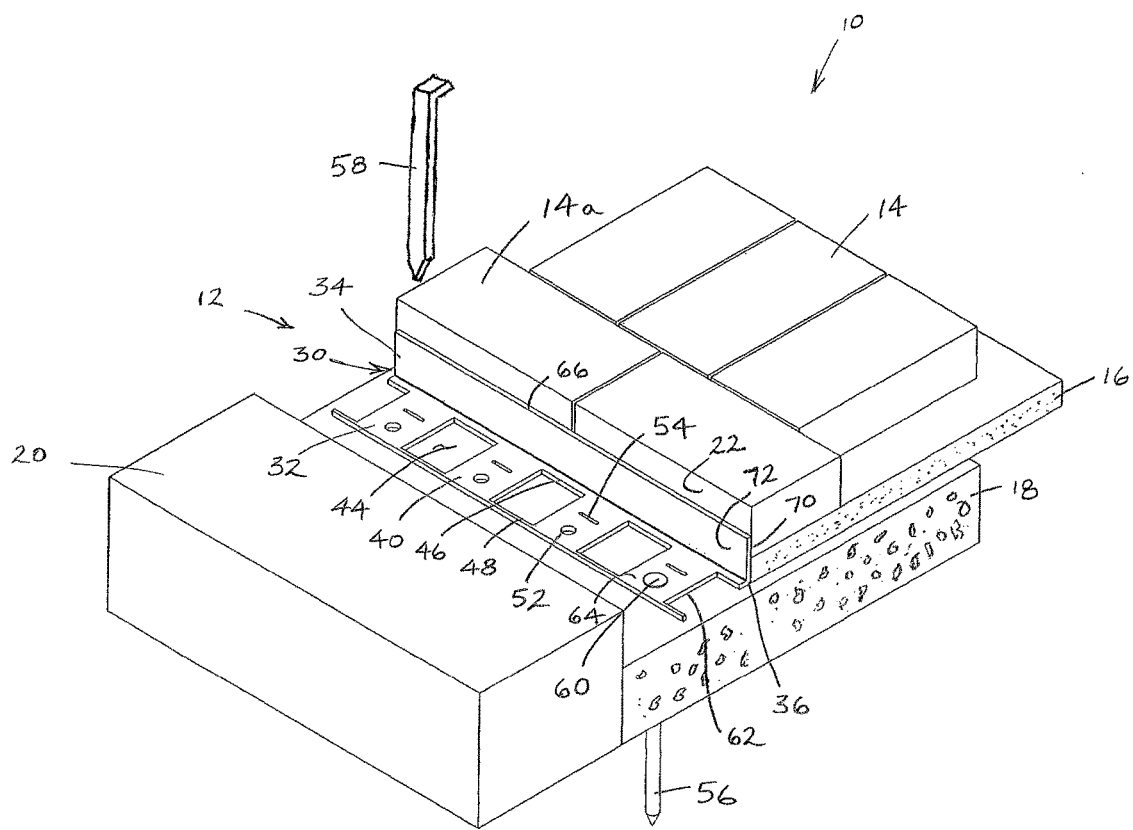
FIG. 1 is a perspective view of a unit pavement system and an edging system for retaining the unit pavement system.

FIG. 1 depicts a unit pavement system 10 and an edging system 12 for retaining the unit pavement system. The unit pavement system 10 is made up of a plurality of individual paver units 14. The paver units 14 are laid on a granular material layer, which can be a sand layer 16 overlaying a crushed limestone layer 18. Other types of aggregate materials can also be used, which are known to persons of ordinary skill in the art. The sand layer 16 and the crushed limestone layer 18 are typically laid upon a compacted or virgin earth (not shown). The area where the unit pavement system 10 is to be installed can be excavated with the crushed limestone layer 18 and the sand layer 16 installed after excavation. The excavation can result in a finished grade 20 being located near an edge 22 of the unit pavement system.

The edging system 12 includes an edge restraint 30, which can have an L-shape, having a horizontal section 32 and a vertical section 34 joined at a corner 36. The edge restraint 30 is made from a rigid material, such as a rigid plastic, metal or composite material. Typically, the edge restraint 30 is an elongate member having a length much greater than a height and width.

The horizontal section 32, which can also be referred to as a base flange, of the edge restraint 30 rests on granular material (as shown in FIG. 1 the crushed limestone layer 18) when installed. The horizontal section 32 includes a plurality of anchoring sections 40 separated by respective voids 44. Each anchoring section 42 is made up of the material, e.g. rigid plastic, metal or composite material, from which the edge restraint 30 is made while the voids 44 are devoid of this material. The anchoring sections 42 are connected to one another by a proximal web 46, which is adjacent to the vertical section 34, and a distal web 48, which is spaced from the vertical section. Two adjacent anchoring sections 42, a respective proximal web 46 and a respective distal web 48 each surround a respective void 44. Fastener openings, such as a round fastener opening 52 and a rectangular fastener opening 54, extend through each anchoring section 42. Fasteners, such as a nail spike 56 and a flat nail stake 58, can be received in the respective openings 52, 54. The nail spike 56 is driven through the round fastener opening 52 until a head 60 of the nail spike 56 contacts the horizontal section 32. The horizontal section 32 defines a lower surface 62 of the edge restraint 30 that contacts the granular material, such as the crushed limestone layer 18. An upper surface 64 of the horizontal section 32 is typically covered with backfill after the installation of the edging system is completed.

The vertical section 34 of the edge restraint 30 extends upwardly from and generally perpendicularly to the horizontal section 32 to an upper edge 66 of the edge restraint 30. The vertical section 34 defines a paver-contacting surface 70 configured to contact the edge 22 of the unit pavement system 10. The vertical section 32 also includes a backfill-contacting surface 72, which is typically covered by backfill when the installation is complete. The vertical section 34 extends upwardly from the horizontal section 32 about 1¾ inches in the illustrated embodiment, and the upper edge 66 of the edge restraint 30 is underneath the backfill when the installation of the unit pavement system 10 is completed.

The edging system 12 depicted in FIG. 1 shows the exterior base flange placement installation method described above. In an alternative arrangement, the edge restraint 30 could be situated so that the paver units 14a along the edge 22 are set on the horizontal section 32, making surface 72 of the vertical section 34 the paver-contacting surface and surface 70 the backfill-contacting surface. Such an installation would be according to the interior base flange placement installation method discussed above. Each of these methods can result in undesirable movement of the edge restraint 30 over time.

Figure 2:
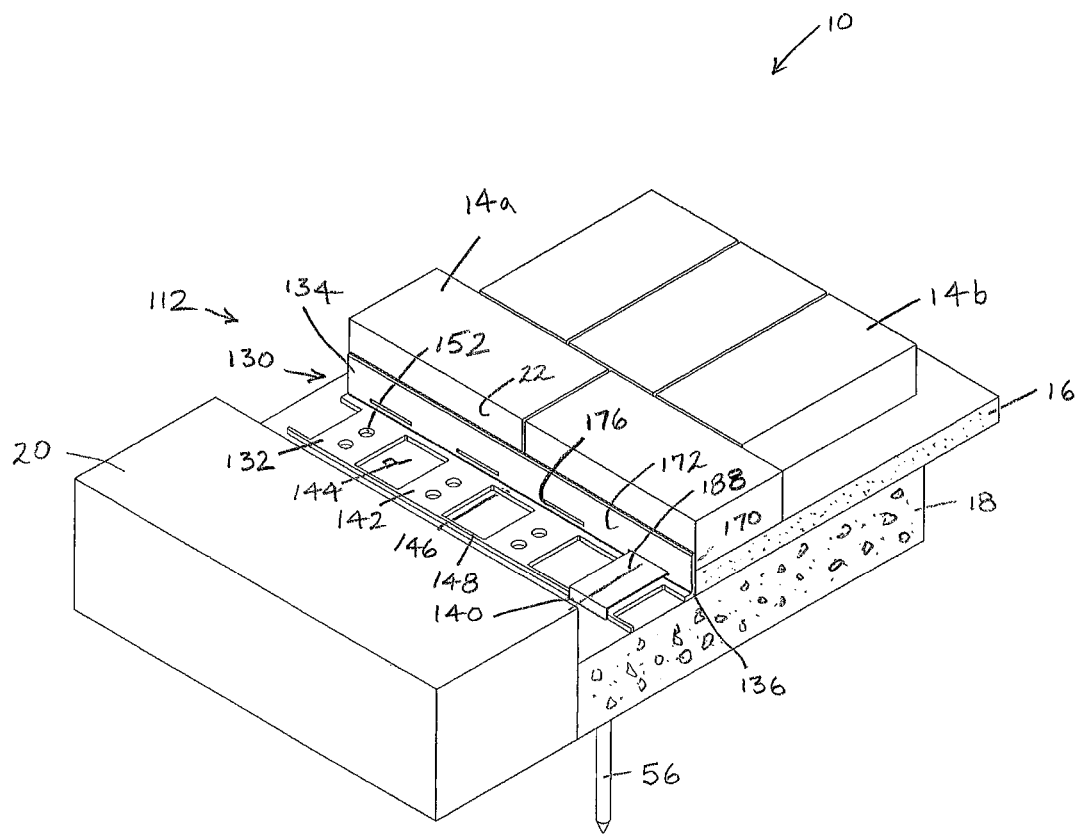
FIG. 2 is a perspective view of a unit pavement system and another edging system.
Figure 3:
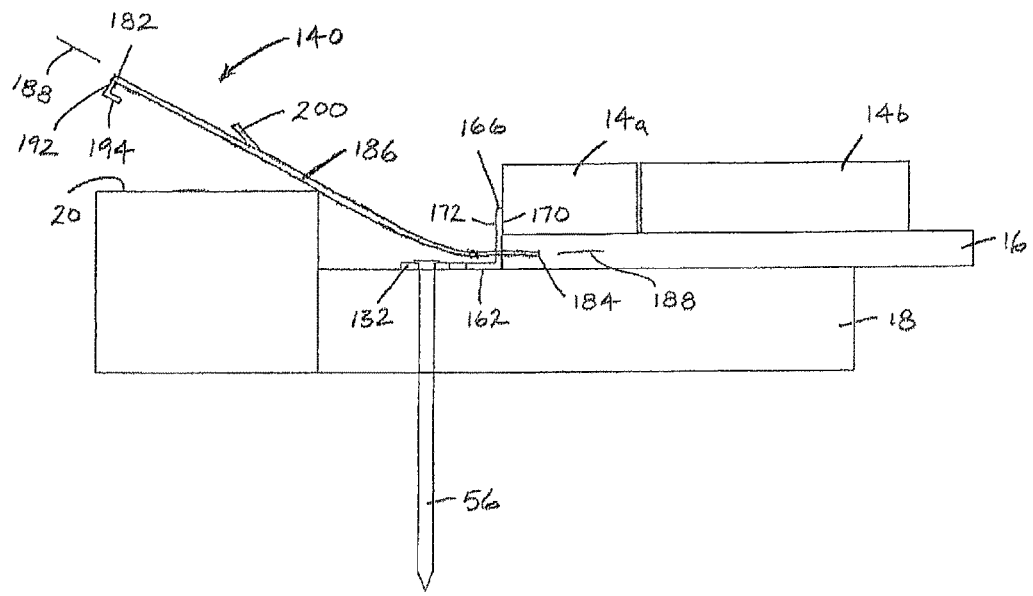
FIG. 3 is a cross-sectional view of the unit pavement system and the edging system of FIG. 2 with a horizontal stake prior to the horizontal stake being driven into a granular material.
Figure 4:
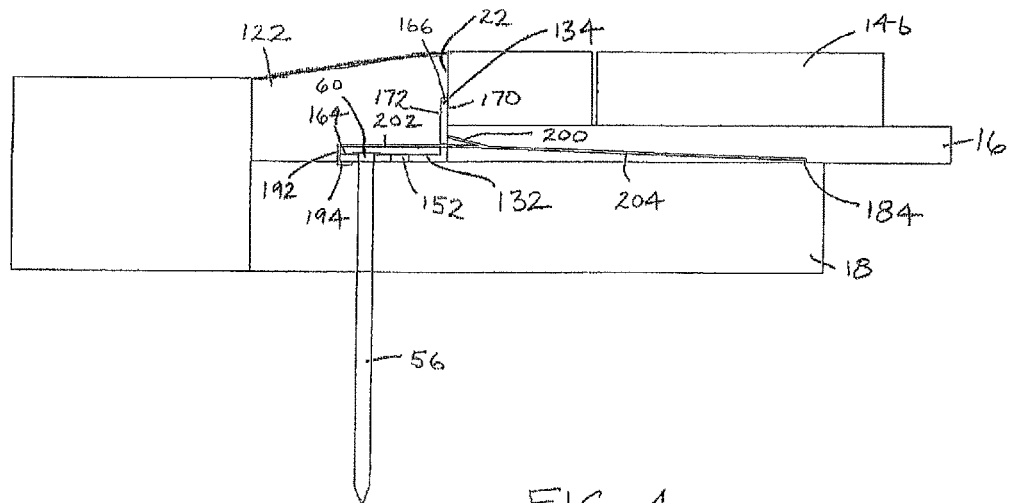
FIG. 4 is a cross-sectional view of the unit pavement system and the edging system of FIG. 2 with a horizontal stake driven into the granular material.

FIGS. 2-4 depict the unit pavement system 10 as shown in FIG. 1 and a novel edging system 112 to restrain the unit pavement system. The edging system 112 includes an edge restraint 130 including a horizontal section 132 and a vertical section 134 joined at a corner 136. The edging system 112 differs from the edging system 12 depicted in FIG. 1 in that the edging system 112 includes a stake 140, which can be referred to as a horizontal stake, operatively connected with the edge restraint 130.

The edge restraint 130, similar to the edge restraint 30 depicted in FIG. 1, is made from a rigid material, such as a rigid plastic, metal or composite material. Similar to the edge restraint 30 depicted in FIG. 1, the edge restraint 130 depicted in FIG. 2 is an elongate member having a length greater than a width and height. The edge restraint 130 depicted in FIG. 2 differs from the edge restraint depicted in FIG. 1 in that the horizontal stake 140, and thus the edge restraint 130 operatively connected thereto, is retained by the weight of some of the paver units 14 of the unit pavement system 10 to restrain vertical and horizontal movement of the edge restraint 130.

The horizontal section 132 of the edge restraint 130 includes a plurality of anchoring sections 142 separated by respective voids 144. The horizontal section 132 also includes a proximal web 146 disposed adjacent the vertical section 134 and a distal web 148 spaced from the vertical section 134. Each void 144 is bounded by two adjacent anchoring sections 142, a respective proximal web 146 and a respective distal web 148. As depicted, the area of each void 144 is greater than the area of each anchoring section 142. Each void 144 is devoid of the material from which the edge restraint 130 is made. Fastener openings 152 extend through the anchoring sections 142. As illustrated in FIG. 2, each fastener opening 152 is circular or round to receive a correspondingly shaped nail spike 56. The fastener openings 152 can take an alternative configuration, such as rectangular, so as to receive a flat nail stake similar to the flat nail stake 58 depicted FIG. 1. As more clearly seen in FIG. 3, the horizontal section 132 defines a lower surface 162 of the edge restraint 130. The lower surface 162 of the edge restraint 130 is planar and rests on granular material such as the crushed limestone layer 18. The horizontal section 132 also includes an upper surface 164, which can be covered by backfill 122 (FIG. 4) when the installation is completed.

The vertical section 134 extends upwardly from and generally perpendicular to the horizontal section 132 to an upper edge 166 of the edge restraint 130. The upper edge 166 is positioned below an upper surface of the unit pavement system 10 when the edge restraint 130 is properly installed. As illustrated in FIGS. 2-4, the horizontal section 132 extends away from the vertical section 134 in a first (external) direction, which is away from the edge 22 of the unit pavement system 10. The vertical section 134 defines a paver-contacting surface 170 that contacts the edge 22 of the unit pavement system 10. The vertical section 134 also includes a backfill-contacting surface 172, which is opposite the paver-contacting surface 170. As illustrated in FIGS. 2-4, the edge restraint 130 is substantially L-shaped; however, the edge restraint can take other configurations, such as T-shaped.

In the embodiment depicted in FIGS. 2-4, the vertical section 134 of the edge restraint 130 includes a plurality of slots 176 that each can receive the horizontal stake 140 to operatively connect the horizontal stake with the edge restraint. Each slot 176 is located closer to the horizontal section 132 of the edge restraint 130 as compared to the upper edge 166 of the vertical section 134. As illustrated, each slot 176 is positioned adjacent to and slightly offset vertically above the corner 136 of the edge restraint 130. The horizontal stake 140 is sized and shaped to correspond to and be closely received within the slot 176. With reference to FIG. 2, each slot 176 is also aligned with a respective anchoring section 142 of the horizontal section 132. This allows the plate-like stake 140 to cover the head 60 of the nail spike 56, or other fastener (e.g., the flat nail stake 58 depicted in FIG. 1) when finally installed (see FIGS. 2 and 4).

With reference to FIG. 3, the horizontal stake 140 includes a first end 182 configured to be struck by a hammer and a second end 184 configured to be driven into coarse sand (e.g., the sand layer 16) or other granular material. The horizontal stake 140 is sufficiently rigid so as to be driven into the sand layer 16 disposed beneath the paver units 14 with a hammer. The horizontal stake 140 also includes a flat and thin (in the vertical direction) main body section 186. The stake 140 can be referred to as plate-like in configuration due to the flat and thin main body section 186. The main body section 186 is flexible enough so as to be bent below the finished grade 20 when driving the horizontal stake in a generally horizontal and internal direction underneath the paver units 14 and into the granular material layer, such as the sand layer 16, upon which the unit pavement system 10 is supported. When driving the horizontal stake 140 in the generally horizontal direction underneath the paver units 14, the main body section 186 is capable of bending along a central longitudinal axis 188 to form a curve as shown in FIG. 3. The horizontal stake 140 can be made from metal, plastic or another composite material capable of the functions described above.

As illustrated, the horizontal stake 140 includes a downwardly extending vertical section 192 that depends downwardly from the main body section 186 at the first end 182. An offset lower horizontal section 194 extends forwardly (toward the second end 184) from the vertical section 192 to form a hook-shaped flange at the first end 182. The offset lower horizontal section 194 is offset from and below the main body section 186 a sufficient distance so as to receive the horizontal section 132 of the edge restraint 130 as shown in FIG. 4. When the horizontal stake 140 is fully driven into its final position, which is shown in FIG. 4, the vertical section 192 engages the horizontal section 132 of the edge restraint 130 and the offset lower horizontal section 194 of the plate-like stake 140 is positioned beneath the horizontal section 132 and can contact the lower surface 162.

The horizontal stake 140 also includes a locking tab 200 disposed between the first end 182 and the second end 184. The locking tab 200 can be resilient to allow the locking tab 200 to pass through the slot 176 in the edge restraint 130. The locking tab 200 can be configured to engage the edge restraint 130 at the paver-contacting surface 170 after the main body section 186 has been sufficiently driven through the slot 176. The locking tab 200 can inhibit movement of the horizontal stake 140 outwardly away from the paver units 14. The locking tab 200 can be punched out of the main body section 186. The locking tab 200 extends vertically upward from a main body section 186 of the horizontal stake 140 and toward the first end 182. In an alternative arrangement, the locking tab 200 could extend downward from the main body section 186. The locking tab 200 can contact the paver-contacting surface 170 of vertical section 134 of the edge restraint 130 when the horizontal stake 140 is fully installed as shown in FIG. 4. When the horizontal stake 140 is fully installed, as shown in FIGS. 2 and 4, an external portion 202 of the horizontal stake 140 extends externally away from the backfill-contacting surface 172 and covers the nail stake 56. This allows the horizontal stake 140 to impede upward vertical movement of the nail stake 56. When the horizontal stake 140 is fully installed, a substantially horizontally disposed internal portion 204 of the plate-like stake 140 extends inwardly away from the paver-contacting surface 170 of the edge restraint 130. The internal portion 204 is part of the main body section 186 that is positioned underneath the paver units 14 in the granular material, which is the sand layer 16 in FIG. 4.

The edging system 112 can be installed by positioning the paver-contacting surface 170 of the edge restraint 130 against the edge 22 of the unit pavement system 10. When doing so, the lower surface 162 of the edge restraint 130 is positioned on granular material, such as the crushed limestone layer 18. The edge restraint 130 can be positioned such that the horizontal section 132 of the edge restraint 130 extends externally away from the edge 22 of the unit pavement system 10. This allows the paver-contacting surface 170 of the edge restraint 130 to be positioned against a finished edge of the paver units, such as the edge 22 shown in FIG. 2. This finished edge 22 can be formed by a cutting process such as the "rip cut" described above whereby the paver units 14 are overlaid past a finish line, and cut with a portable saw along the finish line to form the finished edge 22. Generally vertically-oriented fasteners, such as the nail spike 56 shown in FIGS. 2-4 or the flat nail spike 58 shown in FIG. 1, are driven into the granular material, such as the crushed limestone layer 18, or ground adjacent the granular material through the fastener openings 156 until the head 60 of the fastener contacts the horizontal section 132. The horizontal stake 140 is driven in a generally horizontal direction underneath at least one paver unit of the plurality of paver units 14 that make up the unit pavement system 10. The horizontal stake 140 can be driven into the granular material layer, such as sand layer 16, upon which the unit pavement system 10 is supported such that the horizontal stake is operatively connected with the edge restraint 130. As illustrated, the horizontal stake 140 is driven through the horizontal slot 176 formed in the vertical section 134 of the edge restraint 130. The horizontal stake 140 can be driven so as to cover the fastener 56 with the horizontal stake. As seen in FIG. 4, the horizontal stake 140 can be driven at least partially underneath an inner paver unit 14b, which is offset inwardly from a row of paver units 14a, along the edge 22 of the pavement system. As such, the main body section 186 of the horizontal stake 140 is driven internally deep enough underneath the plurality of pavers 14 so that an adequate amount of pressure can be applied by the paver units to resist vertical and horizontal movement of the horizontal stake.

A number of different variations of edging systems for unit pavement systems that include an edge restraint and a horizontal stake operatively connected with the edge restraint will now be described in more detail. Components and aspects of one embodiment can be employed in many different arrangements. A few further embodiments will be described below. However, the invention is not limited to only the embodiments described herein.

FIGS. 5A-5G depict alternative embodiments of horizontal stakes. FIG. 5A depicts a horizontal stake 140a having a first end 182a configured to be struck by a hammer and a second end 184a configured to be driven into a granular material such as coarse sand or aggregate. The horizontal stake 140a includes a flat and thin (in the vertical direction) main body section 186a. The main body section 186a is flexible enough to be bent below the finished grade surface so as to take a configuration similar to that shown in FIG. 3 where a longitudinal axis 188a of the horizontal stake 140a is curved. The horizontal stake also includes an upward flange 192a that extends upwardly from the main body section 186a. The upward flange 192a can be rolled over to further strengthen the flange. The horizontal stake 140a also includes a locking tab 200a that can be punched out of the main body section. The locking tab 200a can extend upwardly from the main body section nearer the first end 182a as compared to the second end 184a.

FIG. 5B depicts a horizontal stake 140b including a first end 182b configured to be struck by a hammer and a second end 184b configured to be driven into a granular material, such as coarse sand. The horizontal stake 140b includes a flat and thin (in the vertical direction) main body section 186b. The main body section 186b is flexible enough to be bent below the finished grade surface so as to take a configuration similar to that shown in FIG. 3 where a longitudinal axis 188b of the horizontal stake 140b is curved. The horizontal stake 140b further includes a downwardly extending vertical section 192b that extends downwardly from the main body section 186b at the first end 182b. An offset lower horizontal section 194b extends forwardly (toward the second end 184b) from the vertical section 192b. The offset lower horizontal section 194b is offset from the main body section 186b a sufficient distance so as to receive the horizontal section 132 of the edge restraint 130 shown in FIGS. 2-4. The horizontal stake 140a also includes a locking tab 200b that can be punched out of the main body section. The locking tab 200b can extend upwardly from the main body section nearer the first end 182b as compared to the second end 184b. The horizontal stake 140b also includes an elongate opening 206b that is dimensioned to receive the nail stake 56 shown in FIGS. 2-4 and/or the flat nail stake 58 shown in FIG. 1. To use the horizontal stake 140b with the edge restraint 130 depicted in FIGS. 2-4, the horizontal stake 140b is first inserted through the slot 176 and driven to a location similar to that shown for this horizontal stake 140 shown in FIGS. 2 and 4. This aligns the elongate opening 206b with the fastener openings 152. The nail stake 56 (or the flat nail stake 58 shown in FIG. 1) can then be driven through the elongate opening 206b and the fastener opening 152.

Figure 6:
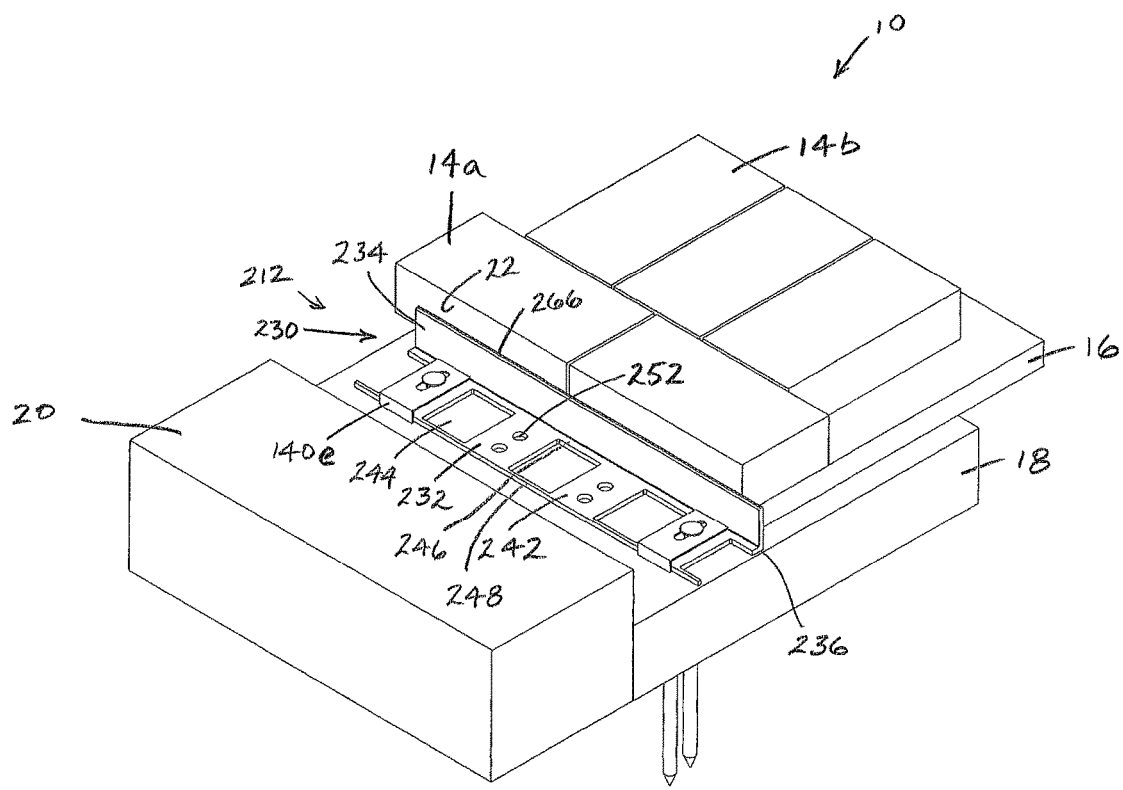
FIG. 6 is a perspective view of a unit pavement system and another edging system.
Figure 7:
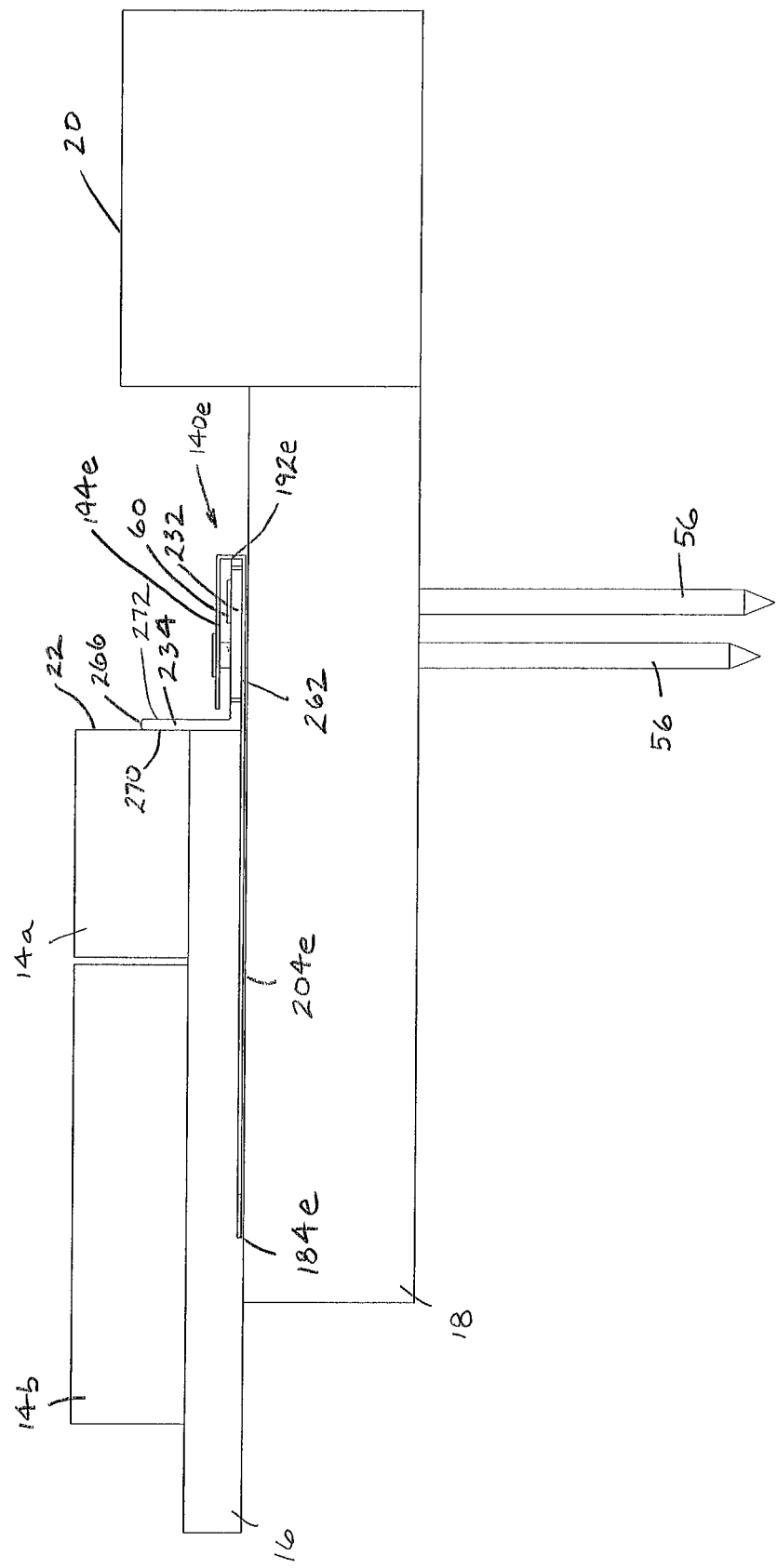
FIG. 7 is a cross-sectional view of the unit pavement system and the edging system of FIG. 6 with a horizontal stake driven into the granular material.

The horizontal stakes shown in FIG. 5C-5G can be used with embodiments described in further detail below. For example, FIGS. 6 and 7 depict an edging system 212 using a plate-like stake 140e shown in FIG. 5E. FIGS. 6 and 7 depict the unit pavement system 10 as shown in FIG. 1 and the edging system 212 to restrain the unit pavement system. The edging system 212 includes an edge restraint 230 including a horizontal section 232 and a vertical section 234 joined at a corner 236. The edging system 212 includes the horizontal stake 140e operatively connected with the edge restraint 230.

The edge restraint 230 is made from a rigid material, such as a rigid plastic, metal or composite material and is an elongate member having a length greater than a width and height. The horizontal section 232 of the edge restraint 230 includes a plurality of anchoring sections 242 separated by respective voids 244, a proximal web 246 and a distal web 248 similar to the edge restraint 130 described above. Fastener openings 252 extend through the anchoring sections 242. The fastener openings 252 can take an alternative configuration, such as rectangular. As more clearly seen in FIG. 7, the horizontal section 232 defines a lower surface 262 of the edge restraint 230. The horizontal section 232 also includes an upper surface 264.

The vertical section 234 extends upwardly from and generally perpendicular to the horizontal section 232 to an upper edge 266 of the edge restraint 230. The vertical section 234 defines a paver-contacting surface 270 that contacts the edge 22 of the unit pavement system 10. The vertical section 234 also includes a backfill-contacting surface 272, which is opposite the paver-contacting surface 270. The edge restraint 230 is substantially L-shaped.

With reference to FIG. 5E, the horizontal stake 140e includes a first end 182e configured to be struck by a hammer and a second end 184e configured to be driven into coarse sand (e.g., the sand layer 16 in FIG. 7) or other granular material. The horizontal stake 140e is sufficiently rigid so as to be driven into the sand layer 16 disposed beneath the paver units 14 with a hammer. The horizontal stake 140e also includes a flat and thin (in the vertical direction) main body section 186e. The main body section 186e is flexible enough so as to be bent below the finished grade 20 when driving the horizontal stake in a generally horizontal and internal direction underneath the paver units 14 and into the granular material layer, such as the sand layer 16, upon which the unit pavement system 10 is supported. When driving the horizontal stake 140e in the generally horizontal direction underneath the paver units 14, the main body section 186e is capable of bending along a central longitudinal axis 188e to form a curve similar to the plate-like stake 140 shown in FIG. 3. The horizontal stake 140e can be made from metal, plastic or another composite material capable of the functions described above.

The horizontal stake 140e includes an upwardly extending vertical section 192e that extends upwardly from the main body section 186e at the first end 182e. An offset upper horizontal section 194e extends forwardly (toward the second end 184e) from the vertical section 192e to form a hook-shaped flange at the first end 182e. The offset upper horizontal section 194e is offset from and above the main body section 186e a sufficient distance so as to receive the horizontal section 232 of the edge restraint 230 as shown in FIG. 7. When the horizontal stake 140e is fully driven into its final position, which is shown in FIG. 7, the vertical section 192e engages the horizontal section 232 of the edge restraint 230 and the offset upper horizontal section 194e of the plate-like stake 140e is positioned above and covers the horizontal section 232.

When the horizontal stake 140e is fully installed, as shown in FIG. 7, the offset upper horizontal section 194e of the horizontal stake 140e covers one of the nail stakes 56 (the right nail stake 56 shown in FIG. 7). This allows the horizontal stake 140e to impede upward vertical movement of this nail stake 56. When the horizontal stake 140e is fully installed as shown in FIG. 7, a substantially horizontally disposed internal portion 204e of the plate-like stake 140 extends inwardly away from the paver-contacting surface 270 of the edge restraint 230. This internal portion 204e is part of the main body section 186e that is positioned underneath the paver units 14 in the granular material, which is the sand layer 16 in FIG. 7.

The edging system 212 can be installed by positioning the paver-contacting surface 270 of the edge restraint 230 against the edge 22 of the unit pavement system 10. When doing so, the lower surface 262 of the edge restraint 230 is positioned on granular material, such as the crushed limestone layer 18. The edge restraint 230 can be positioned such that the horizontal section 232 of the edge restraint 230 extends externally away from the edge 22 of the unit pavement system 10. This allows the paver-contacting surface 270 of the edge restraint 230 to be positioned against a finished edge of the paver units, such as the edge 22 shown in FIG. 2. This finished edge 22 can be formed by a cutting process such as the "rip cut" described above. Generally vertically-oriented fasteners, such as the right nail spike 56 shown in FIG. 7 (or the flat nail spike 58 shown in FIG. 1) are driven into the granular material, such as the crushed limestone layer 18, or ground adjacent the granular material through the fastener openings 256 until the head 60 of the fastener contacts the horizontal section 232.

The horizontal stake 140e is driven in a generally horizontal direction underneath at least one paver unit of the plurality of paver units 14 that make up the unit pavement system 10. The horizontal stake 140e can be driven into the granular material layer, such as sand layer 16, upon which the unit pavement system 10 is supported such that the horizontal stake is operatively connected with the edge restraint 230. As illustrated, the horizontal stake 140e is driven underneath the horizontal section 232 of the edge restraint 130. The horizontal stake 140e includes an elongate slot 208e (FIG. 5E) extending from the second end 184e toward the first end 182e through the main body section 186e. The elongate slot 208e is centered along the longitudinal axis 188e. The plate-like stake 140e is driven with the right fastener 56 shown in FIG. 7 received in the elongate slot 208e. As seen in FIG. 7, the horizontal stake 140e can be driven at least partially underneath an inner paver unit 14b, which is offset inwardly from a row of paver units 14a, along the edge 22 of the pavement system. The offset upper horizontal section 194e of the horizontal stake 140e also includes the elongate opening 206e. The horizontal stake 140e is first driven underneath the horizontal section 262 of the edge restraint 230 to the location shown in FIG. 7. This aligns the elongate opening 206e with one of the inner fastener openings 252 (closer to the vertical section 234). The left nail stake 56 shown in FIG. 7 (or the flat nail stake 58 shown in FIG. 1) can then be driven through the elongate opening 206e, the fastener opening 252 and the elongate slot 208e.

FIGS. 5C, 5D and 5F depict other plate-like stakes 140c, 140d and 140f, respectively, that are configured to operatively connect with an edge restraint, such as the edge restraint 230 depicted in FIGS. 6 and 7, by being driven underneath the horizontal section 232.

FIG. 5C depicts the horizontal stake 140c includes a first end 182c configured to be struck by a hammer and a second end 184c configured to be driven into coarse sand (e.g., the sand layer 16 in FIG. 7) or other granular material. The horizontal stake 140c is sufficiently rigid so as to be driven into the sand layer 16 disposed beneath the paver units 14 with a hammer. The horizontal stake 140c also includes a flat and thin (in the vertical direction) main body section 186c. The main body section 186c is flexible enough so as to be bent below the finished grade 20 when driving the horizontal stake in a generally horizontal and internal direction underneath the paver units 14 and into the granular material layer, such as the sand layer 16, upon which the unit pavement system 10 is supported. When driving the horizontal stake 140c in the generally horizontal direction underneath the paver units 14, the main body section 186c is capable of bending along a central longitudinal axis 188c to form a curve similar to the plate-like stake 140 shown in FIG. 3. The horizontal stake 140c can be made from metal, plastic or another composite material capable of the functions described above.

The horizontal stake 140c includes an upwardly extending vertical section 192c that extends upwardly from the main body section 186c at the first end 182c. An offset upper horizontal section 194c extends forwardly (toward the second end 184c) from the vertical section 192c to form a hook-shaped flange at the first end 182c. The offset upper horizontal section 194c is offset from and above the main body section 186c a sufficient distance so as to receive the horizontal section 232 of the edge restraint 230 shown in FIG. 7. When the horizontal stake 140c is fully driven into its final position, similar to the position shown in FIG. 7, the vertical section 192c engages the horizontal section 232 of the edge restraint 230 and the offset upper horizontal section 194c of the plate-like stake 140c is positioned above and covers the horizontal section 232.

The horizontal stake 140c can be driven underneath the horizontal section 232 of the edge restraint 130. The horizontal stake 140c includes an elongate slot 208c extending from the second end 184c toward the first end 182c through the main body section 186c. The elongate slot 208c is centered along the longitudinal axis 188c. The plate-like stake 140c is driven so as to receive and to cover the right fastener 56 shown in FIG. 7. The horizontal stake 140c can be driven at least partially underneath an inner paver unit 14b, which is offset inwardly from a row of paver units 14a, along the edge 22 of the pavement system. The horizontal stake 140c is driven underneath the horizontal section 262 of the edge restraint 230 to the location shown in FIG. 7 after insertion of the right nail stake 56 shown in FIG. 7. The left nail stake 56 shown in FIG. 7 would not be used with this plate-like stake 140c.

A plate-like stake similar to horizontal stake 140c but without the elongate slot (i.e., the main body section 186c would be similar to the main body section 186b) could also be used similar to the horizontal stake 140c. Such a stake would operatively connect with the edge restraint 130 by engaging the horizontal section 132, however, the plate-like stake would be laterally offset from the nail spikes 56.

FIG. 5D depicts the horizontal stake 140d includes a first end 182d configured to be struck by a hammer and a second end 184d configured to be driven into coarse sand or other granular material. The horizontal stake 140d is sufficiently rigid so as to be driven into the sand layer 16 disposed beneath the paver units 14 with a hammer. The horizontal stake 140d also includes a flat and thin (in the vertical direction) main body section 186d. The main body section 186d is flexible enough so as to be bent below the finished grade 20 when driving the horizontal stake in a generally horizontal and internal direction underneath the paver units 14 and into the granular material layer, such as the sand layer 16, upon which the unit pavement system 10 is supported. The horizontal stake 140d can be made from metal, plastic or another composite material capable of the functions described above.

The horizontal stake 140d includes an upwardly extending vertical section 192d that extends upwardly from the main body section 186d at the first end 182d. An offset upper horizontal section 194d extends forwardly (toward the second end 184d) from the vertical section 192d to form a hook-shaped flange at the first end 182d. The offset upper horizontal section 194d is offset from and above the main body section 186d a sufficient distance so as to receive the horizontal section 232 of the edge restraint 230 shown in FIG. 7.

The horizontal stake 140c can be driven underneath the horizontal section 232 of the edge restraint 130. The offset upper horizontal section 194d of the horizontal stake 140d also includes an elongate opening 206d aligned with an elongate hole 208d in the main body section 186d. The horizontal stake 140d is driven underneath the horizontal section 262 of the edge restraint 230 to the location shown in FIG. 7 prior to driving the nail stake 56 shown in FIG. 7. One of the nail stakes 56 shown in FIG. 7 can then be driven through the elongate opening 206d in the offset upper horizontal section 194d, the fastener opening 256 in the horizontal section 232 of the edge restraint 230 and the elongate hole 208d in the main body section 186d. A tab 200d similar to the tabs described above can also extend upwardly from the main body section 186d.

FIG. 5F depicts a plate-like stake 140f that is the same in configuration as the plate-like stake 140e described above, except the elongate opening 206f is rectangular (so as to accommodate the flat nail stake 58 shown in FIG. 1). The plate-like stake 140f operates in the same manner as the plate-like stake 140e described above.

FIG. 5G depicts a horizontal stake 140g having a first end 182g configured to be struck by a hammer and a second end 184g configured to be driven into a granular material. The horizontal stake 140g includes a flat and thin (in the vertical direction) main body section 186g. The main body section 186g is flexible similar to the plate-like stakes described above. The horizontal stake 186g also includes a flange 192g that extends upwardly from the main body section 186g at the first end 182g. The flange 192g can be rolled over to further strengthen the flange. The plate-like stake 140g, and more particularly the main body section 186g thereof, defines a longitudinal central axis 188g. The flange 192g is angled at an angle other than perpendicular with respect to the longitudinal central axis 188g. The horizontal stake 140g also includes a locking tab 200g similar to the locking tabs described above.

Figure 8:
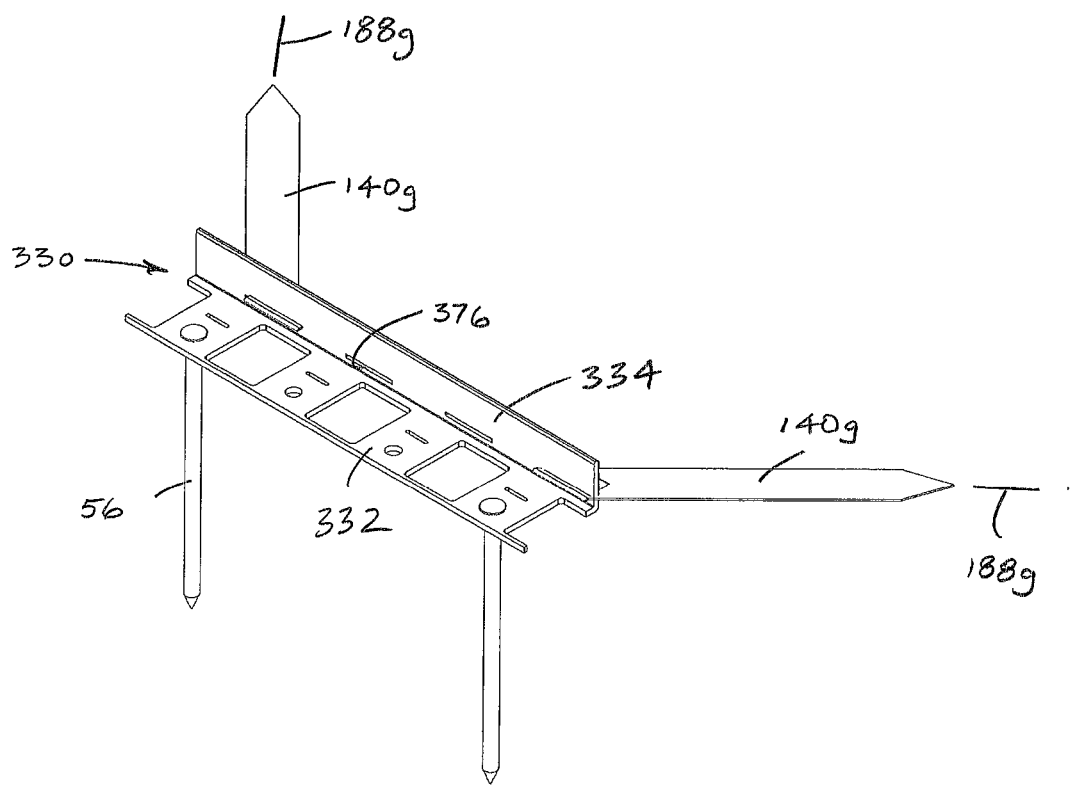
FIG. 8 is a perspective view of another edging system.

FIG. 8 depicts an edge restraint 330 similar in configuration to the edge restraint 30 described in FIG. 1 except for the addition of a plurality of slots 376 similar to the slots 76 in the edge restraint 30 shown in FIG. 2. In FIG. 8, the central axis 188g of each plate-like stake 140g is offset from the vertical section 334 of the edge restraint 330 at an angle other than 90 degrees as measured in a plane parallel to the horizontal section 332 of the edge restraint.

Figure 9:
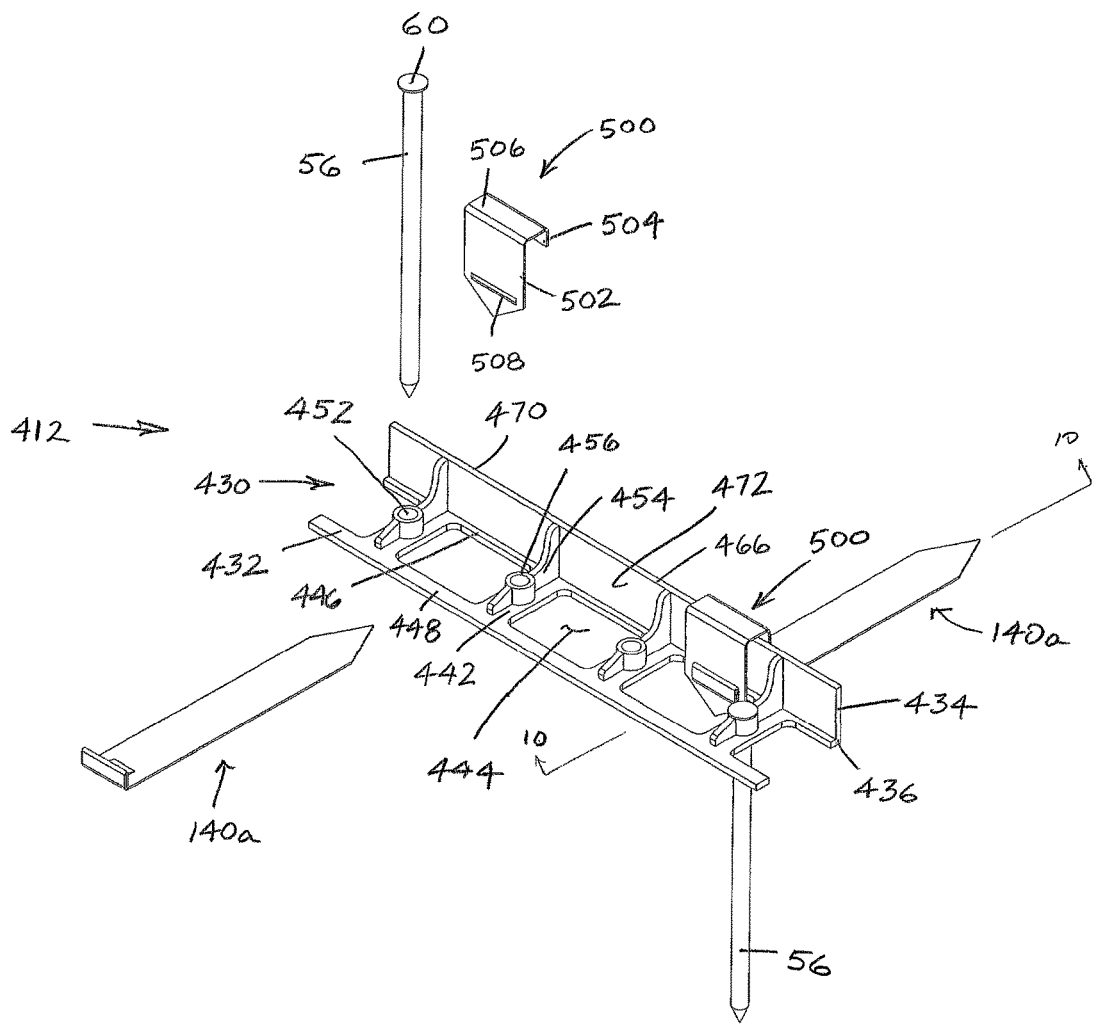
FIG. 9 is a perspective view of another edging system having a clip.
Figure 10:
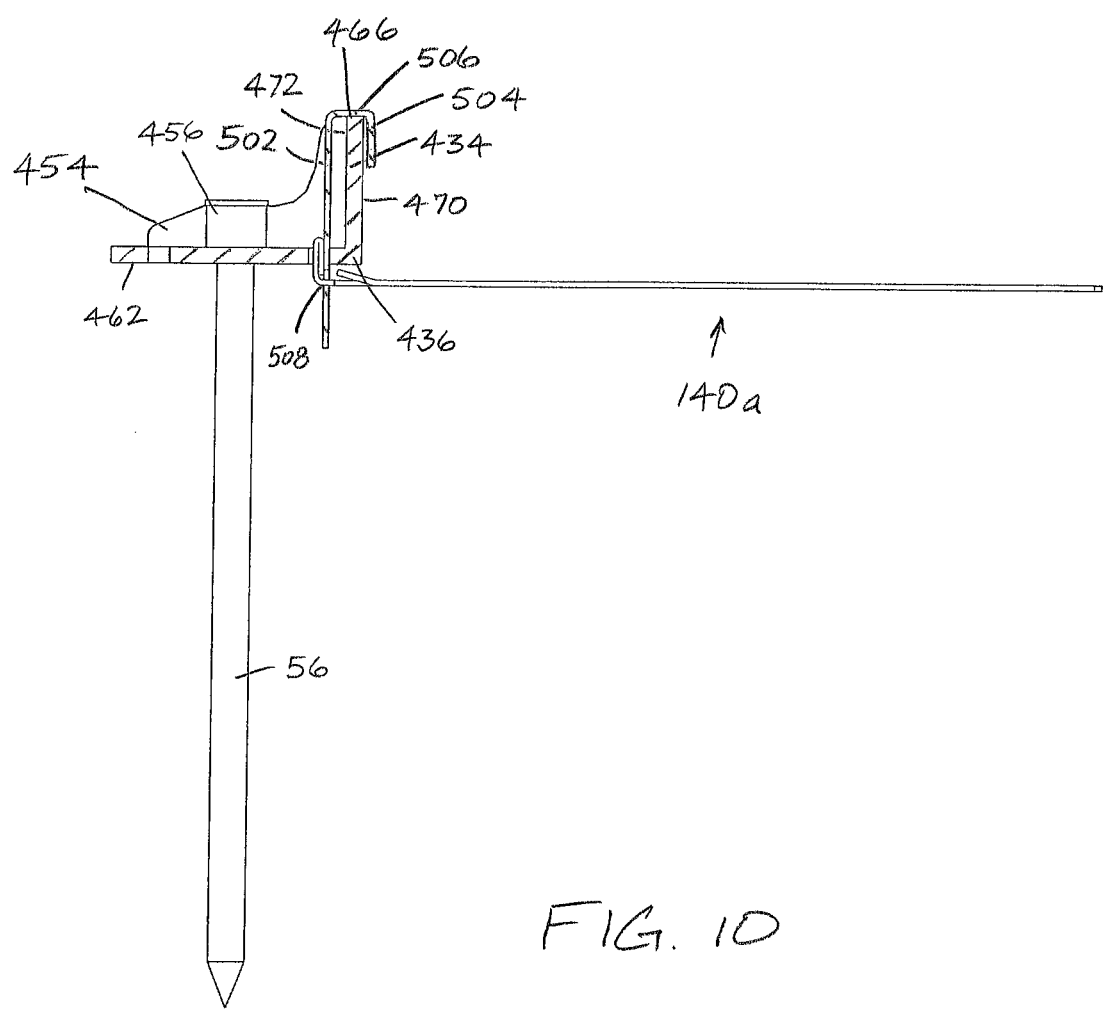
FIG. 10 is a cross-sectional view of the edging system of FIG. 9 taken along line 10-10 of FIG. 9.

FIGS. 9 and 10 depict an edging system 412 to restrain a unit pavement system (not shown, but similar to the unit pavement system 10 described above). The edging system 412 includes an edge restraint 430 including a horizontal section 432 and a vertical section 434 joined at a corner 436. The edging system 412 employs the horizontal stake 140a shown also in FIG. 5A operatively connected with the edge restraint 430. The edge restraint 430 depicted in FIGS. 9 and 10 is made from a rigid plastic material.

The horizontal section 432 of the edge restraint 430 includes a plurality of anchoring sections 442 separated by respective voids 444. The horizontal section 432 also includes a proximal web 446 disposed adjacent the vertical section 434 and a distal web 448 spaced from the vertical section 434. Each void 444 is bounded by two adjacent anchoring sections 442, a respective proximal web 446 and a respective distal web 448. Each void 444 is devoid of the material from which the edge restraint 430 is made.

Fastener openings 452 extend through the anchoring sections 442. As illustrated in FIG. 9, buttresses 454 extend upwardly from each anchoring section 442 connecting the respective anchoring section to the vertical section 434. Bosses 456 also extend upwardly from each anchoring section 442 and define the fastener openings 452. Each fastener opening 452 is circular or round to receive a correspondingly shaped nail spike 56. The fastener openings 452 can take an alternative configuration, such as rectangular, so as to receive a flat nail stake similar to the flat nail stake 58 depicted FIG. 1. As more clearly seen in FIG. 10, the horizontal section 432 defines a lower surface 462 of the edge restraint 430. The lower surface 462 of the edge restraint 430 is planar and rests on granular material such as the crushed limestone layer 18 (see FIG. 2).

The vertical section 434 extends upwardly from and generally perpendicular to the horizontal section 432 to an upper edge 466 of the edge restraint 430. The upper edge 466 is positioned below an upper surface of the unit pavement system (not shown in FIGS. 9 and 10) when the edge restraint 430 is properly installed. As illustrated in FIGS. 9 and 10, the horizontal section 432 extends away from the vertical section 434 in a first (external) direction, which is away from the edge of the unit pavement system (not shown in FIGS. 9 and 10). The vertical section 434 defines a paver-contacting surface 470. The vertical section 434 also includes a backfill-contacting surface 472, which is opposite the paver-contacting surface 470.

In the embodiment depicted in FIGS. 9 and 10, the edging system 412 includes a clip 500 to operatively connect the plate-like stake 140a with the edge restraint 430. The clip 500 includes a main vertical section 502, a second vertical section 504 spaced from the main vertical section, a cap section 506 connecting the main vertical section to the second vertical section, and a slot 508 in the main vertical section that receives the plate-like stake 140a. The cap section 506 contacts the vertical section 434, and more particularly the upper edge 466, of the edge restraint 430 and the slot 508 is positioned adjacent to and below the corner 436 of the edge restraint 430 when fully installed (see FIG. 10). The slot 508 is sized and shaped to correspond to and closely receive the plate-like stake 140a. The horizontal stake 140a is also sized and shaped to correspond to and be closely received within the slot 508. With reference to FIG. 9, each clip 500 is sized to be received in a respective void 444 of the horizontal section 432 of the edge restraint 430. As such, the clip 500 can be used with other edge restraints that include similarly shaped voids. Alternatively, the orientation of the clip 500 with respect to the edge restraint 430 could be changed where the main vertical section 502 is adjacent to the paver-contacting surface 470 (i.e., the clip is rotated 180 degrees about a central vertical axis).

The edging system 412 can be installed by positioning the paver-contacting surface 470 of the edge restraint 430 against the edge of the unit pavement system (not shown in FIGS. 9 and 10). The edge restraint 430 can be positioned such that the horizontal section 432 of the edge restraint 430 extends externally away from the edge of the unit pavement system. This allows the paver-contacting surface 470 of the edge restraint 430 to be positioned against a finished edge of the paver units, such as the edge 22 shown in FIG. 2. This finished edge 22 can be formed by a cutting process such as the "rip cut" described above. Fasteners, such as the nail spike 56 shown in FIGS. 9 and 10 or the flat nail spike 58 shown in FIG. 1, are driven into the granular material or ground adjacent the granular material through the fastener openings 452 until the head 60 of the fastener contacts the boss 456. The horizontal stake 140a is driven in a generally horizontal direction underneath at least one paver unit of the plurality of paver units that make up the unit pavement system. As illustrated, the horizontal stake 140a is driven through the horizontal slot 508 formed in the main vertical section 502 of the clip 500 after the clip 500 has been driven into the granular material through the void 444 in the horizontal section 442. As seen in FIG. 10, the horizontal stake 140a can be driven underneath the vertical section 434 of the edge restraint. The main body section 186a of the horizontal stake 140a is driven internally deep enough underneath the plurality of pavers so that an adequate amount of pressure can be applied by the paver units to resist vertical and horizontal movement of the horizontal stake.

Clips having other shapes are shown in FIGS. 11A-11D. FIG. 11A depicts a clip 500a including a main vertical section 502a, a second vertical section 504a spaced from the main vertical section, a cap section 506a connecting the main vertical section to the second vertical section, and a slot 508a in the main vertical section that receives a plate-like stake, such as the plate-like stake 140a. The clip 500a further includes a horizontal section 512a that extends in a direction away (internally) from a lower end of the second vertical section 504a. The horizontal section 512a is positioned above the slot 508a.

FIG. 11B depicts a clip 500b including a main vertical section 502b, a second vertical section 504b spaced from the main vertical section, a cap section 506b connecting the main vertical section to the second vertical section, and a slot 508b in the main vertical section. The second vertical section 504b extends downwardly from the cap 506b the same distance as the main vertical section 502b and includes a slot 514b aligned with the slot 508b. Each slot 508b, 514b is sized and shaped to correspond to and closely receive a plate-like stake such as the plate-like stake 140a.

FIG. 11C depicts a clip 500c including a main vertical section 502c, a second vertical section 504c spaced from the main vertical section, a cap section 506c connecting the main vertical section to the second vertical section, and a slot 508c in the main vertical section. The clip 500c further includes an additional main vertical section 522c, an additional second vertical section 524c spaced from the additional main vertical section, an additional cap section 526c connecting the additional main vertical section to the additional second vertical section, and an additional slot 528c in the additional main vertical section. Each slot 508c, 528c is sized and shaped to correspond to and closely receive a plate-like stake such as the plate-like stake 140a. The main vertical section 502c is disposed at a 90 degree angle with respect to the additional main vertical section 522c in the illustrated embodiment, however, other angular relationships are available.

FIG. 11D depicts a clip 500d very similar in configuration to the clip 500c, however, a single slot 508d extends through both the main vertical section 502d and the additional main vertical section 522d.

Figure 12:
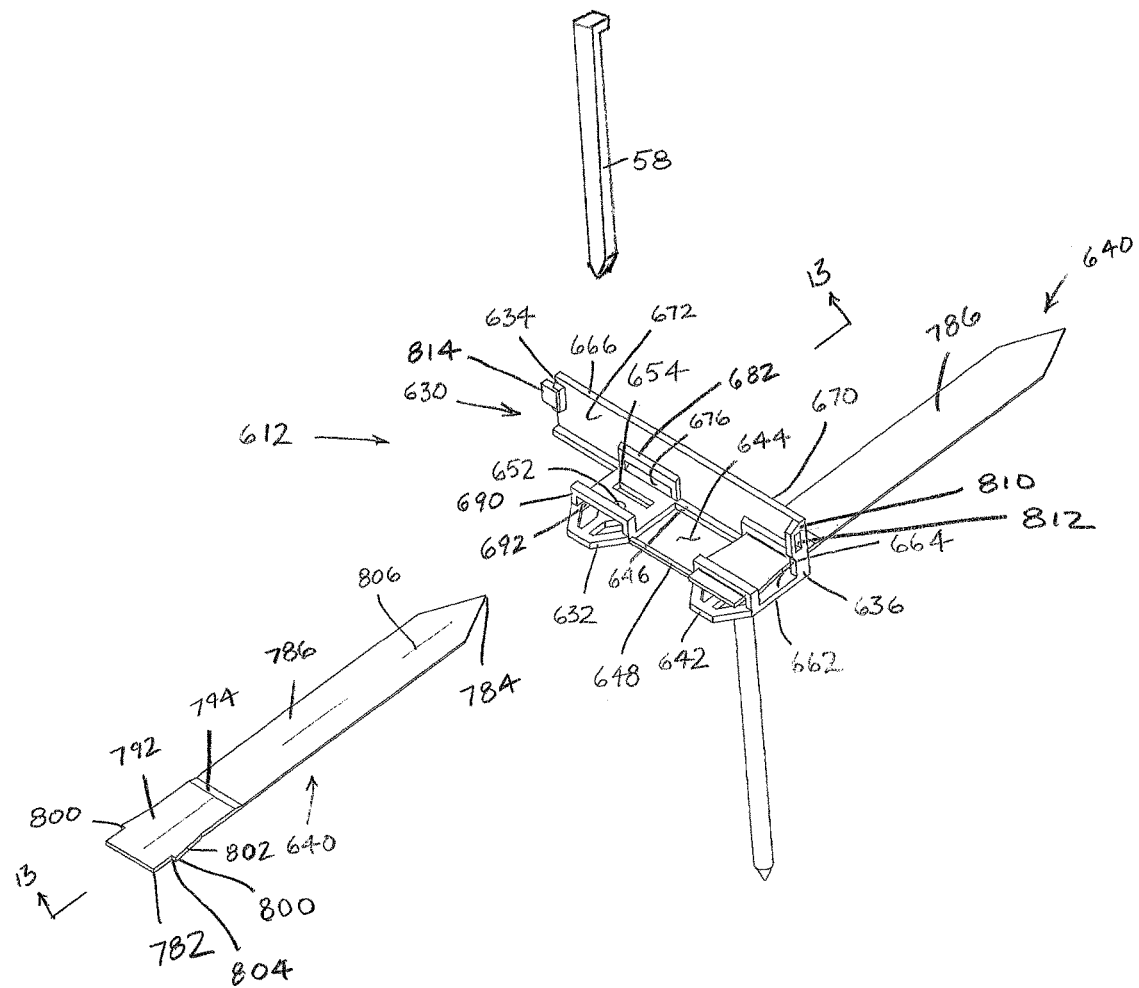
FIG. 12 is a perspective view of another edging system.
Figure 13:
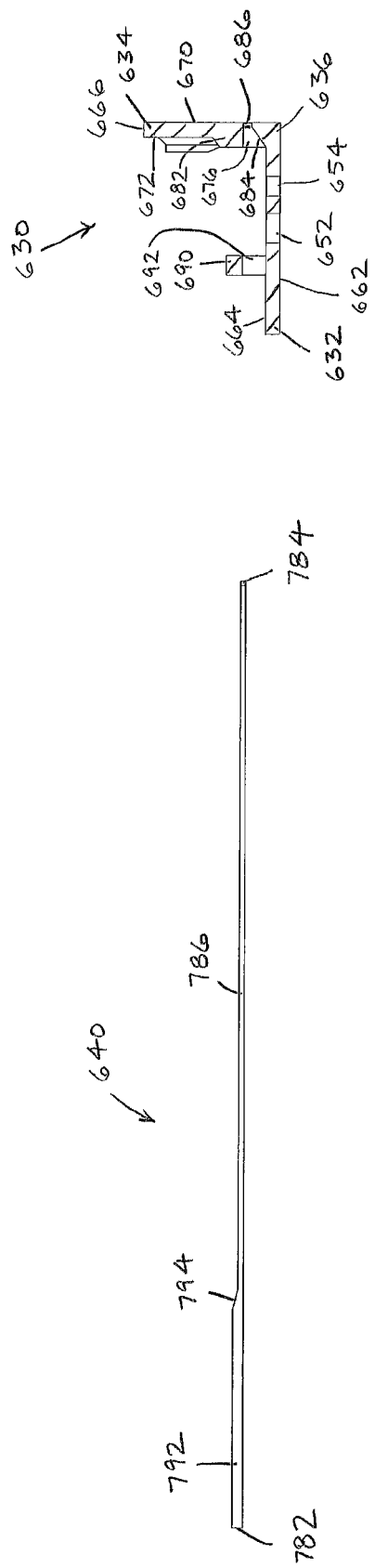
FIG. 13 is a cross-sectional view of the edging system of FIG. 12 taken along line 13-13 of FIG. 12.

FIGS. 12 and 13 depict another edging system 612 to restrain a unit pavement system. The edging system 612 includes an edge restraint 630 including a horizontal section 632 and a vertical section 634 joined at a corner 636. The edging system 612 includes a horizontal stake 640 operatively connected with the edge restraint 630. The edge restraint 630 is made from a rigid plastic material, but could also be made from metal or composite material. The edge restraint 630 is an elongate integrally formed member having a length greater than a width and height (the edge restraint can be much longer than that shown in FIG. 12).

The horizontal section 632 of the edge restraint 630 includes a plurality of anchoring sections 642 separated by respective voids 644. The horizontal section 632 also includes a proximal web 646 disposed adjacent the vertical section 634 and a distal web 648 spaced from the vertical section 634. Each void 644 is bounded by two adjacent anchoring sections 642, a respective proximal web 646 and a respective distal web 648. The area of each void 644 is greater than the area of each anchoring section 642. Each void 644 is devoid of the material from which the edge restraint 630 is made.

Fastener openings, such as a round (circular) fastener opening 652 and a rectangular fastener opening 654, extend through each anchoring section 642. Fasteners, such as a nail spike 56 and a flat nail stake 58 (see FIG. 1), can be received in the respective openings 652, 654. The nail spike 56 is driven through the round fastener opening 652 until a head 60 of the nail spike 56 contacts the horizontal section 632. The flat nail stake 58 (see FIG. 1) is particularly useful when the edging system 612 is used to retain permeable pavement. As more clearly seen in FIG. 13, the horizontal section 632 defines a lower surface 662 of the edge restraint 630. The lower surface 662 of the edge restraint 630 is planar and rests on granular material when installed. The horizontal section 632 also includes an upper surface 664, which can be covered by backfill 122 (see FIG. 4) when the installation is completed.

The vertical section 634 extends upwardly from and generally perpendicular to the horizontal section 632 to an upper edge 666 of the edge restraint 630. The upper edge 666 is positioned below an upper surface of the unit pavement system when the edge restraint 630 is properly installed. The horizontal section 632 extends away from the vertical section 634 in a first (external) direction, which is away from the edge of the unit pavement system, when the edge restraint is installed. The vertical section 634 defines a paver-contacting surface 670 that contacts the edge of the unit pavement system. The vertical section 634 also includes a backfill-contacting surface 672, which is opposite the paver-contacting surface 670. The edge restraint 630 is substantially L-shaped; however, the edge restraint can take other configurations.

The vertical section 634 of the edge restraint 630 includes a plurality of slots 676 that each can receive the horizontal stake 640 to operatively connect the horizontal stake with the edge restraint. Each slot 676 is located closer to the horizontal section 632 of the edge restraint 630 as compared to the upper edge 666 of the vertical section 634. As illustrated, each slot 676 is positioned adjacent to and slightly offset vertically above the corner 636 of the edge restraint 630. The horizontal stake 640 is sized and shaped to correspond to and be closely received within the slot 676. Each slot 676 is also aligned with a respective anchoring section 642, which allows the plate-like stake 640 to cover the head 60 of the nail spike 56, or other fastener (e.g., the flat nail stake 58 depicted in FIG. 1) when finally installed.

The vertical section 634 of the edge restraint 630 includes a thickened frame section 682 that surrounds at least three sides of each respective horizontal slot 676. Each thickened frame section 682 provides structural rigidity to the vertical section 634 near each slot 676. As seen in FIG. 13, a ramp 684 is provided in each slot 676. The ramp 684 slopes upwardly from the backfill-contacting surface 672 toward the paver-contacting surface 670. A knockout section 686 can be provided in each slot 676. The knockout section 686 is configured to be punched out when the plate-like stake 640 is driven through the slot 676. In an installation where a respective slot 676 does not receive a plate-like stake 640, the knockout section, which will remain, can preclude the migration of granular material to the back side of the edge restraint 630.

The edge restraint 630 includes a frame 690 extending from the horizontal section 632 at each anchoring section 642. The frame 690 is spaced from the vertical section 634 in the first (external) direction. The frame 690 defines an additional slot 692 that receives the plate-like stake 640 when the plate-like stake is driven through the slots 676, 692 and into the granular material.

The horizontal stake 640 includes a first end 782 configured to be struck by a hammer and a second end 784 configured to be driven into coarse sand or other granular material. The horizontal stake 640 is sufficiently rigid so as to be driven into the sand layer disposed beneath the paver units with a hammer. The horizontal stake 640 also includes a flat and thin (in the vertical direction) main body section 786. The main body section 786 is flexible enough so as to be bent below the finished grade when driving the horizontal stake in a generally horizontal direction (similar to the embodiment shown in FIG. 3).

The horizontal stake 640 includes a thickened section 792 adjacent the first end 782. A ramp 794 provides a transition from the main body section 786 to the thickened section 792. The horizontal stake 640 also includes a locking tab 800 (two are shown in FIG. 12) disposed between the first end 182 and the second end 184. The frame 690 can be resilient to allow the locking tabs 800 to pass through the additional slot 692 in the frame. The locking tabs 800 are configured to engage the edge restraint 630 at the frame 690 after the main body section 786 has been sufficiently driven through the slot 676 in the vertical section 634. The locking tabs 800 can inhibit movement of the horizontal stake 640 outwardly away from the paver units. The locking tabs 800 extend horizontally outward from the main body section 786 of the horizontal stake 640 and each include a ramped edge 802 that is tapered toward the second end 784. Each locking tab 800 is somewhat barb-shaped and includes a shelf 804 at the rear end of each ramped edge 802. The shelf 804 is perpendicular to the longitudinal axis 806 of the plate-like stake. The locking tab 800, and more particularly each shelf 804, contacts the frame 690 on the horizontal section 632 of the edge restraint 630 when the horizontal stake 640 is fully installed. When the horizontal stake 640 is fully installed, the thickened section 792 of the horizontal stake 640 extends externally away from the backfill-contacting surface 672 and covers the nail stake 56. This allows the horizontal stake 640 to impede upward vertical movement of the nail stake 56. When the horizontal stake 640 is fully installed, the main body section 786 of the plate-like stake 640 extends inwardly away from the paver-contacting surface 670 of the edge restraint 630. The main body section 786 is positioned underneath the paver units in the granular material so as to be retained by the weight of the paver units. The horizontal stake 640 can be made from metal, plastic or another composite material capable of the functions described above.

The edge restraint 630 also includes a vertical end wall 810 having an opening 812. A tab 814 extends from an opposite end of the edge restraint 630. The tab 814 of one edge restraint is received in the opening 812 to connect two edge restraints. Otherwise, the edging system 612 can be installed similarly to the edging system 112 described above.

Figure 14:
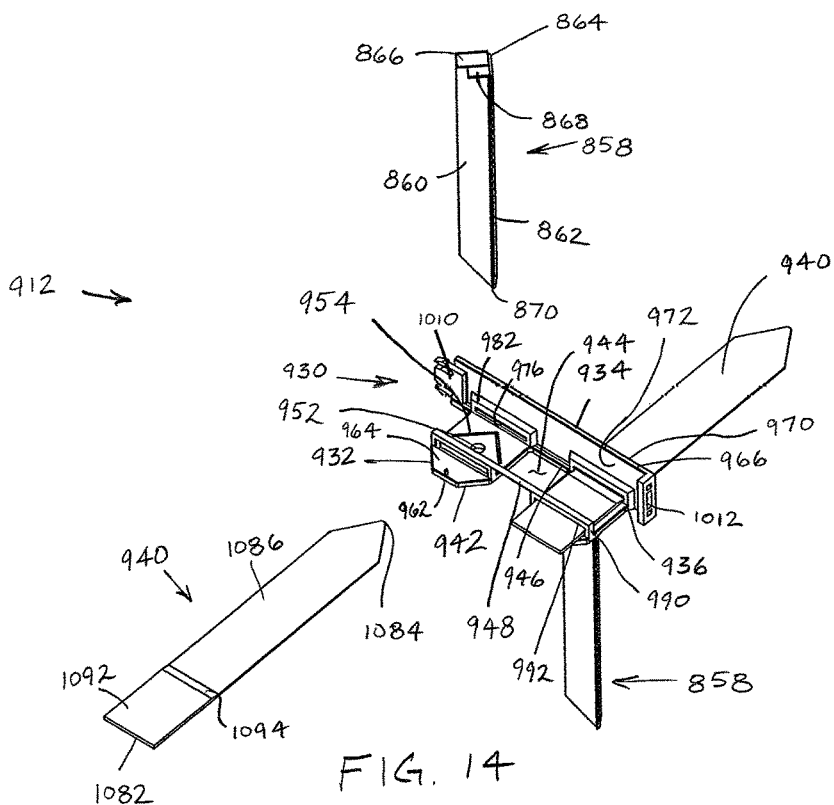
FIG. 14 is a perspective view of another edging system.

FIG. 14 depicts another edging system 912 to restrain a unit pavement system. The edging system 912 includes an edge restraint 930 including a horizontal section 932 and a vertical section 934 joined at a corner 936. The edging system 912 includes a horizontal stake 940 operatively connected with the edge restraint 930. The edge restraint 930 is made from a rigid material, such as plastic, but could be made from another type of rigid material. The edge restraint 930 is an elongate integrally formed member having a length greater than a width and a height that can be much longer than that shown in FIG. 14.

The horizontal section 932 of the edge restraint 930 includes a plurality of anchoring sections 942 separated by respective voids 944. The horizontal section 932 also includes a proximal web 946 disposed adjacent to the vertical section 934 and a distal web 948 spaced from the vertical section 934. Each void 944 is bounded by two adjacent anchoring sections 942, the proximal web 946 and a respective distal web 948. Each void 944 is devoid of the material from which the edge restraint 930 is made.

Fastener openings, such as a round (circular) fastener opening 952 and a v-shaped fastener opening 954, extend through each anchoring section 942. Fasteners, such as a nail spike 56 (see FIG. 1) can be received in the circular opening 952. FIG. 14 depicts a fastener 858, which may also be referred to as a nail stake, particularly useful when the edging system 912 is used to retain permeable pavement. The fastener 858 can be made from a one-piece stamped sheet of metal. The fastener 858 can be formed to include a first (left) vertical section 860 and a second (right) vertical section 862, which are joined at an apex 864. An upper section of the first vertical section 860 is bent over to form an upper horizontal flange 866 at the top of the stake 858. The second vertical section 862 is also be bent over at an upper section to form a lower horizontal flange 868, which is positioned below the upper horizontal flange 866. The flanges 866, 868 are perpendicular with respect to the respective vertical sections 860, 862. The fastener 858 also includes a lower pointed end 870, which facilitates driving the fastener 858 into granular material. With the fastener 858 received in a respective v-shaped opening 954 (see lower fastener 858 in FIG. 14), movement of the edge restraint 930 in a horizontal direction away from the paver units (not shown, but similar to unit pavement system 10 described above) is precluded. In the illustrated embodiment, the v-shaped opening 954 is pointed towards the vertical section 934, which accommodates the v-shaped fastener 858. In the v-shaped fastener 858 is configured to collect or gather any aggregate directing the aggregate toward to the apex 864 if it is moved in the horizontal direction away from the paver units.

The horizontal section 932 of the edge restraint 930 defines a lower surface 962 of the edge restraint. The lower surface 962 is planar and rests on the granular material when installed. The horizontal section 932 also includes an upper surface 964, which is covered by back fill (for example see back fill 122 in FIG. 4) when the installation is completed.

The vertical section 934 extends upwardly from and generally perpendicular to the horizontal section 932 to an upper edge 966 of the edge restraint 930. The upper edge 966 is positioned below an upper surface of the unit pavement system when the edge restraint 930 is properly installed. The horizontal section 932 extends away from the vertical section 934 in a first (external) direction, which is away from the edge of the unit pavement system, when the edge restraint is installed. The vertical section 934 defines a paver-contacting surface 970 that contacts the edge of the unit pavement system. The vertical section 934 also includes a back fill-contacting surface 972, which is opposite the paver-contacting surface 970. The edge restraint 930 is typically L-shaped; however, the edge restraint can take other configurations. The vertical section 934 of the edge restraint 930 includes a plurality of slots 976 that each can receive a horizontal stake 940 to operatively connect the horizontal stake with the edge restraint. Each slot 976 is located closer to the horizontal section 932 or corner 936 of the edge restraint 930 as compared to the upper edge 966 of the vertical section 934. Each slot 976 is positioned adjacent to and slightly offset vertically above the corner 936 of the edge restraint 930. The horizontal stake 940 is sized and shaped to correspond to and be closely received within the slot 976. Each slot 976 is also aligned with a respective anchoring section 942, which allows the horizontal stake 940 to cover the top (flanges 866, 868) of the fastener 856 when finally installed.

The vertical section 934 of the edge restraint 930 includes a thickened framed section 982 that surrounds at least three sides of each respective horizontal slot 976. Each thickened framed section 982 that provides structural rigidity to the vertical section 934 near each slot 976. A ramp (similar to the ramp 684 shown in FIG. 13) can be provided in each slot 976. A knockout section (not visible, but similar to the knockout section 686 in FIG. 13) can be provided in each slot 976. The knockout section is configured to be punched out when the horizontal stake 940 is driven through the slot 976.

The edge restraint 930 also includes a frame 990 extending from the horizontal section 932 at each anchoring section 942. The frame 990 is spaced from the vertical section 934 in the first (external) direction. The frame 990 defines an additional slot 992 that receives the horizontal stake 940 when the horizontal stake is driven through the slots 976, 992 and into the granular material upon which the paver units rest. Adjacent frames 990 are connected by the distal web 948.

The horizontal stake 940 is similar to the stake 640 described with reference to FIGS. 12 and 13, without the locking tab 790 shown in FIGS. 12 and 13. The horizontal stake 940 includes a first end 1082 configured to be struck by a hammer and a second end 1084 configured to be driven into coarse sand or other granular material. The horizontal stake 940 is sufficiently rigid so as to be driven with a hammer into the sand layer disposed beneath the paver units. The horizontal stake 940 also includes a flat and thin (in the vertical direction) main body section 1086. The main body section 1086 is flexible enough so as to be bent below the finished grade when driving the horizontal stake in a generally horizontal direction.

The horizontal stake 940 includes a thickened section 1092 adjacent the first end 1082. A ramp 1094 provides a transition from the main body section 1086 to the thickened section 1092. The ramp 1094 and/or the thickened section 1092 can operate as a sort of locking tab. The thickened section 1092 is configured to frictionally engage the vertical section 934 of the edge restraint 930 around the slot 976 after the main body 1086 has been driven a predetermined length (e.g., the distance between the second end 1084 and where the ramp 1094 transitions to the thickened section 1092) through the slot 976 in the vertical section 934. The frictional engagement between the thickened section 1092 and the vertical section 934 around the slot 976 can inhibit movement of the horizontal stake 940 outwardly away from the paver units. The thickened section 1092 can contact and frictionally engage the frame 990 on the horizontal section 932 of the edge restraint 930 in a similar manner as the vertical section 934 around the slot 976 when the horizontal stake 940 is fully installed. When the horizontal stake 940 is fully installed, the thickened section 1092 of the horizontal stake 1040 can extend externally away from the back fill-contacting surface 972 and cover the fastener 858. This allows the horizontal stake 940 to impede upward vertical movement of the fastener 858. When the horizontal stake 940 is fully installed, the main body portion 1086 of the horizontal stake 940 extends inwardly away from the paver contacting surface 970 of the edge restraint 930. The main body section 1086 is positioned underneath the paver units and the granular material so as to be retained by the weight of the paver units. The horizontal stake 940 can be made from metal, plastic or another composite material capable of the functions described above.

The edge restraint can also include connectors 1010 and 1012. The connectors 1010 can engage the connectors 1012 to connect to adjacent pieces of edge restraint 930.

Figure 15:
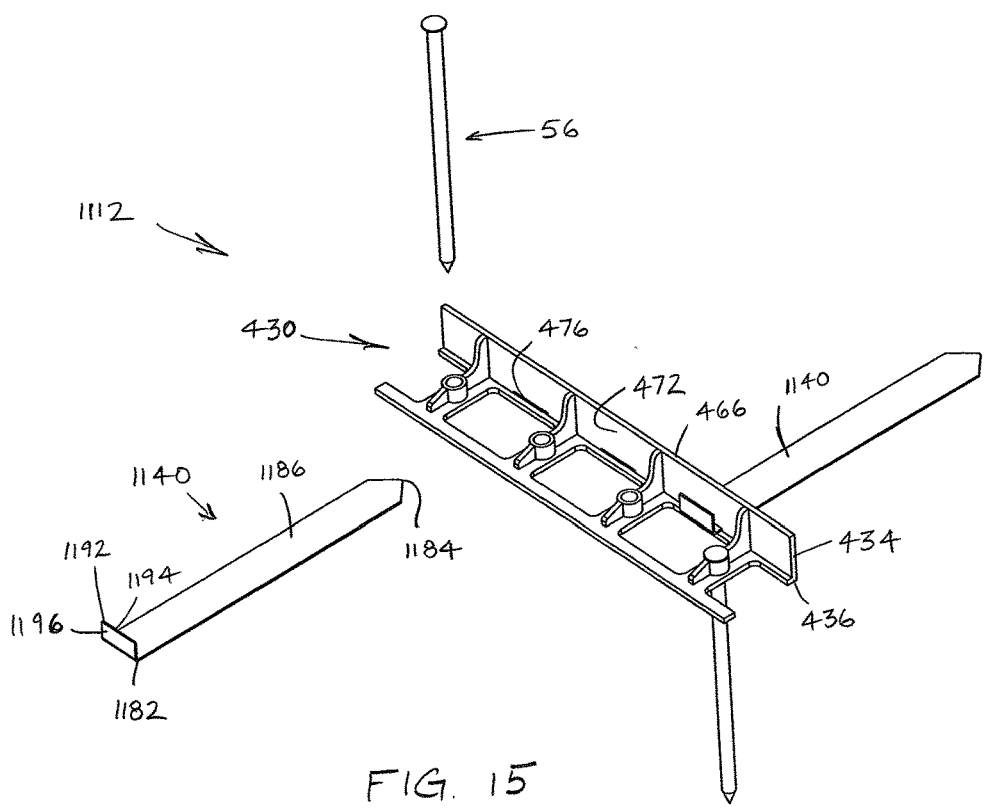
FIGS. 15-17 are perspective views of another edging system using different types of horizontal stakes.
Figure 16:
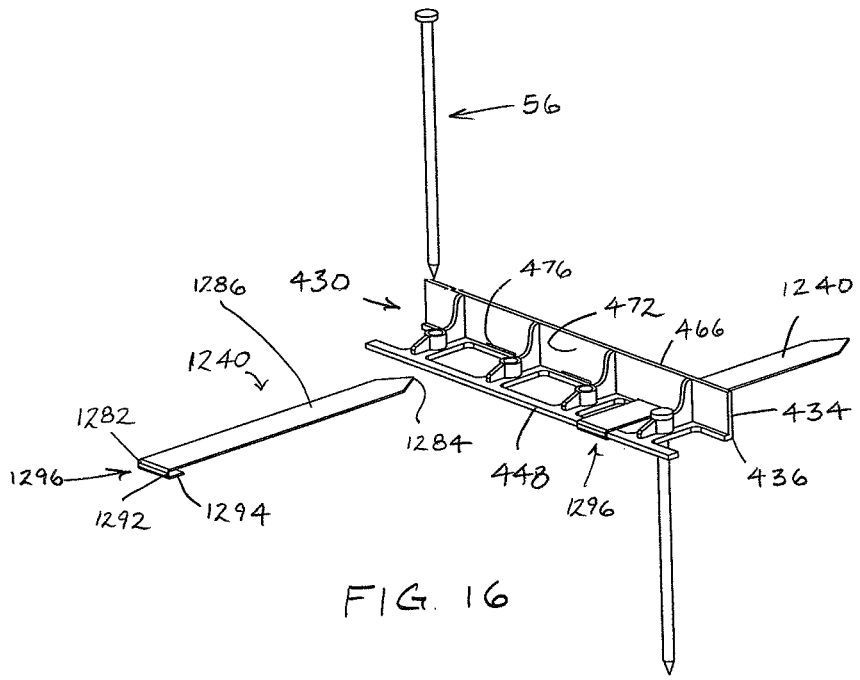
Figure 17:
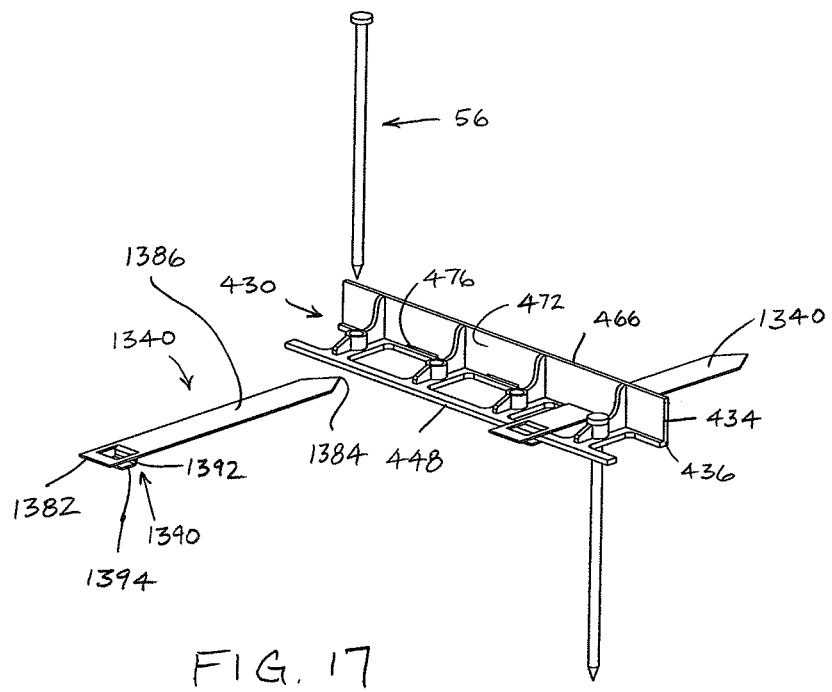

FIGS. 15-17 depict an edging system 1112 to restrain a unit pavement system (not shown, but similar to the unit pavement system 10 described above) having an edge restraint 430 that is similar in every respect to the edge restraint 430 depicted in FIGS. 9 and 10, with the exception that slots 476 are provided in the vertical section 434. Since the edge restraint in FIGS. 15-17 is similar in every respect, with the exception of the addition of the slots, the reference numbers used in FIGS. 9 and 10 with reference to the edge restraint will be used in FIGS. 15-17.

The vertical section 434 of the edge restraint 430 includes a plurality of slots 476 that each can receive a horizontal stake such as the horizontal stake 140a shown in FIG. 5a, as well as the horizontal stake 1140 (FIG. 15), the horizontal stake 1240 (FIG. 16), the horizontal stake 1340 (FIG. 17) and other similarly shaped horizontal stakes. Each slot 476 is located closer to the horizontal section 432 of the edge restraint 430 as compared to the upper edge 466 of the vertical section 434. Each slot 476 is positioned adjacent to and slightly offset vertically above the corner 436 of the edge restraint 430. Each slot 476 is positioned offset from a respective anchoring section 442 in a lengthwise (greatest dimension) direction and is aligned with a respective void 444.

FIG. 15 depicts a horizontal stake 1140 having a first end 1182, which can be configured to be struck by a hammer, and a second end 1184 configured to be driven into a granular material such as coarse sand or aggregate. The horizontal stake 1140 includes a flat and thin (in the vertical direction) main body section 1186. The main body section 1186 is flexible enough to be bent below the finished grade surface in a manner similar to that shown in FIG. 3. The horizontal stake 1140 also includes an upwardly extending tab 1192 at the first end 1182 of the stake 1140. The upwardly extending tab 1192 is perpendicular to the main body section 1186 and can be rolled over to further strengthen the tab. The tab 1192 operates as a sort of locking tab when fully installed to preclude horizontal movement of the horizontal stake 1140 in an outward direction away from the paver units.

When in use, the horizontal stake 1140 is driven through the slot 476 in the vertical section 434 of the edge restraint 430 until the upwardly extending tab 1192 is positioned adjacent to the vertical section 434 of the edge restraint 430. The horizontal stake 1140 can be driven through the slot 476 such that an inner vertical planar surface 1194 of the tab 1192 contacts the back fill-contacting surface 472 of the vertical section 434. When fully installed, back fill covers the edge restraint 430 in a manner similar to that shown in FIG. 4 and the back fill 122 (FIG. 4) acts against an outer surface 1196, which can be planar, of the upwardly extending tab 1192 to preclude outward movement of the tab 1192 away from the vertical section 434, and thus movement of the horizontal stake 1140 away from underneath the paver units.

FIG. 16 depicts a horizontal stake 1240 having an alternative configuration than the stake 1140, but can be used with the same edge restraint 430. The horizontal stake 1240 includes a first end 1282, which can be configured to be struck by a hammer, and a second end 1284 configured to be driven into coarse sand or other granular material. The horizontal stake 1240 is sufficiently rigid so as to be driven with a hammer into the sand layer disposed beneath the paver units. The horizontal stake 1240 also includes a flat and thin (in the vertical direction) main body section 1286. The main body section is flexible so as to be bent similar to the configuration shown in FIG. 3. The plate like stake 1240 can be made from metal, plastic or another composite material. The plate like stake 1240 includes a downwardly extending vertical section 1292 that extends downwardly from the main body section 1286 at the first end 1282. An offset lower horizontal section 1294 extends forwardly (toward the second end 1284) from the vertical section 1292 to form a hook-shaped flange 1296 at the first end 1282. The offset lower horizontal section 1294 is offset from and below the main body section 1286 a sufficient distance so as to receive the distal web 448 of the edge restraint 430 as shown in FIG. 16. When the horizontal stake 1240 is fully driven into its final position, which is shown for the vertical stake 1240 on the lower right in FIG. 16, the vertical section 1292 of the hook-shaped flange 1296 contacts the distal web 448 and the offset lower horizontal section 1294 can lock into and engage with the distal web 448 such that the hook-shaped flange 1296 operates as a locking tab to engage the edge restraint 430 to inhibit movement of the stake 1240 with respect to the edge restraint.

FIG. 17 depicts another horizontal stake 1340 that cooperates with the edge restraint 430. The horizontal stake 1340 includes a first end 1382, which can be configured to be struck by a hammer, and a second end 1384 configured to be driven into a granular material. The horizontal stake 1340 includes a flat and thin (in the vertical direction) main body section 1386. The main body section 1386 is flexible so as to be bent similar to the stake shown in FIG. 3. The horizontal stake 1340 also includes a tab 1390, which can be a locking tab, that is punched out of the main body section 1386. The locking tab 1390 extends downwardly from the main body section 1386 nearer the first end 1382 as compared to the second end 1384. The tab 1390 is made up of a downwardly extending vertical section 1392 that extends downwardly from the main body section 1386. An offset lower horizontal section 1394 extends rearwardly (toward the first end 1382) from the vertical section 1392 to form a hook-shaped flange, which can operate as a locking tab. When the horizontal stake 1340 is driven through the slot 476 in the vertical section 434, the stake is driven such that the tab 1390 rides over the distal web 448. The first end 1382 of the stake 1340 can then be pulled back toward the distal web 448 so that the tab 1390 engages the distal web 448. Engagement of the tab 1390 with the distal web 448 precludes movement of the stake 1386 in both the horizontal and vertical direction with respect to the edge restraint 430.

Figure 18:
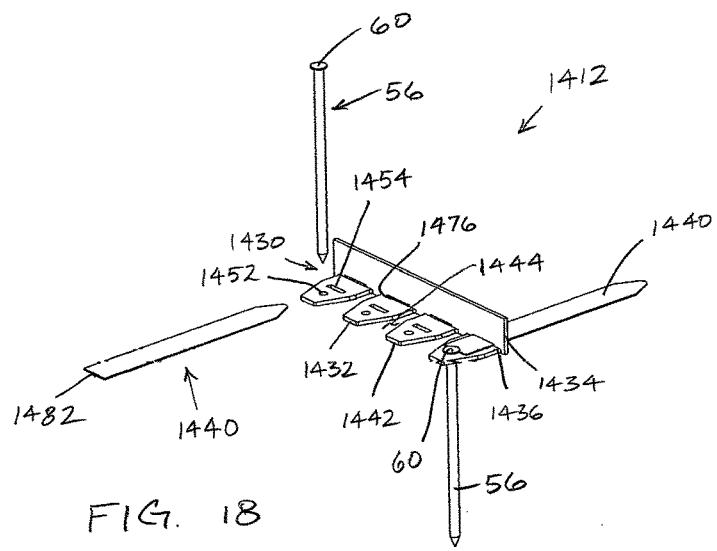
FIG. 18 is a perspective view of another edging system.

FIG. 18 depicts another edging system 1412 to restrain a unit pavement system similar to the unit pavement system 10 depicted in FIG. 1. The edging system 1412 includes an edge restraint 1430 including a horizontal section 1432 and a vertical section 1434 joined at a corner 1436. The edging system 1412 includes a horizontal stake 1440 operatively connected with the edge restraint 1430. The edge restraint 1430 is made from a rigid material similar to the edge restraints described above and can have a length greater than the length shown in FIG. 18.

The horizontal section 1432 of the edge restraint 1430 includes a plurality of anchoring sections 1442 separated by respective voids 1444. The horizontal section 1432 includes fastener openings 1452, which are circular, and fastener openings 1454, which are rectangular, each extending through a respective anchoring section 1442. Fasteners, such as a nail spike 56 and a flat nail stake 58 (FIG. 19) can be received in the respective openings 1452, 1454.

Figure 19:
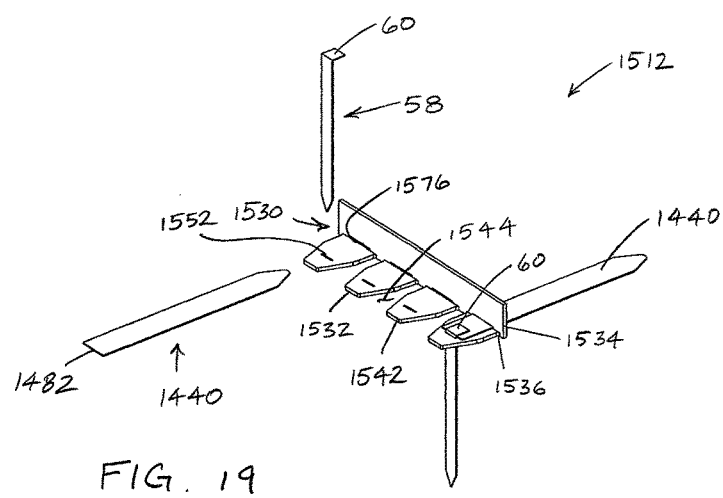
FIG. 19 is a perspective view of another edging system similar to the system shown in FIG. 18.

FIG. 19 depicts an edging system 1512 similar to the edging system 1412 in FIG. 18. The edging system 1512 restrains a unit pavement system, such as the unit pavement system 10 depicted in FIG. 1. The edging system 1512 includes an edge restraint 1530 including a horizontal section 1532 and a vertical section 1534 joined at a corner 1536. The edging system 1512 includes a horizontal stake 1440, which is the same as the stake in FIG. 18, operatively connected with the edge restraint 1530. The edge restraint 1530 is made from a rigid material and is elongated having a length greater than a width and height, and can be much longer than that shown in FIG. 19. The horizontal section 1532 of the edge restraint 1530 includes a plurality of anchoring sections 1542 separated by respective voids 1544. The anchoring sections 1542 each include fastener openings, which as illustrated are rectangular openings 1552 to receive fasteners such as the flat nail stake 58.

To use the edging systems 1412, 1512 depicted in FIGS. 18 and 19, the horizontal stakes 1440 are driven through slots 1476, 1576 formed in the vertical section 1434, 1534 of the respective edge restraints 1430, 1530. The horizontal stakes 1440 are driven past the appropriate fastener opening 1452 in FIGS. 18 and 1552 in FIG. 19. The fasteners 56, 58 are then driven in the appropriate openings 1452 in FIGS. 18 and 1552 in FIG. 19 until a head 60 of each respective fastener 56, 58 contacts the horizontal stake 1440, typically at the first end 1482 of the horizontal stake 1440, to retain the stake and inhibit movement of the stake with respect to the edge restraint.

Figure 20:
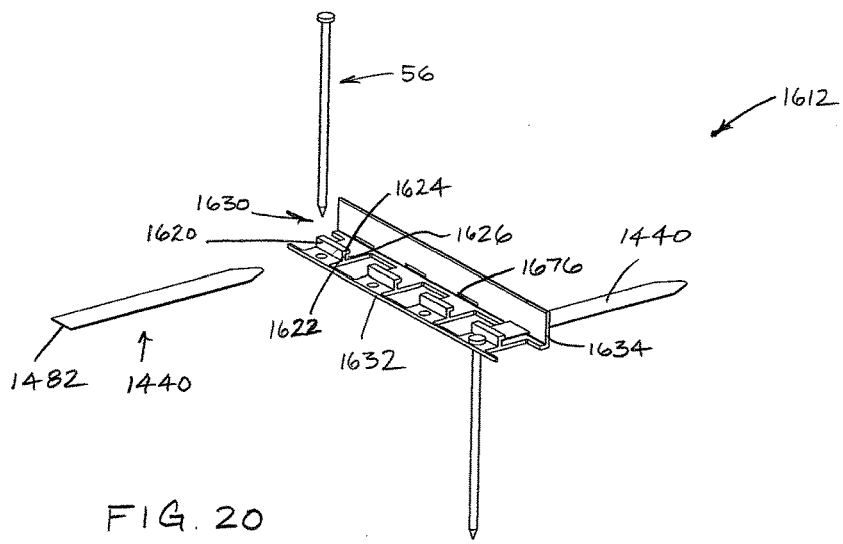
FIG. 20 is a perspective view of another edging system.

FIG. 20 depicts another edging system 1612 that includes an edge restraint 1630 that differs from the edge restraint 130 depicted in FIG. 2 only in the manner of having a retainer 1620 for retaining a horizontal stake such as the horizontal stake 1440 shown in FIG. 20. The retainer 1620 extends upwardly from a horizontal section 1632 of the edge restraint 1630 and is offset from a vertical section 1634 of the edge restraint in a first (external) direction. The retainer 1620 is generally upside down L-shaped including a vertical section 1622 that extends upwardly and perpendicularly from the horizontal section 1632 of the edge restraint 1630 so as to be generally parallel with the vertical section 1634 of the edge restraint. A horizontal section 1624 of the retainer 1620 is offset from the horizontal section 1632 of the edge restraint 1630 so that a gap 1626 is provided to receive the first end 1482 of the horizontal stake 1440 when the horizontal stake is driven into its final position, which is shown for the lower right stake 1440 in FIG. 20. Since the remainder of the edge restraint 1630, with the exception of the retainer 1620, is essentially the same as the edge restraint 130 depicted in FIG. 2, a further description thereof has been omitted. Where the edge restraint 1630 includes such a retainer 1620 on the horizontal section 1632, the stake 1440 can be driven through the slot 1676 in the vertical section 1634 until the first end 1482 of the stake 1440 passes over the retainer 1620 moving toward the vertical section 1634. The first end 1482 can then be pressed downward, and if desired pulled back so as to contact the vertical section 1622 of the retainer 1620, which locks the horizontal stake 1440 in position to preclude movement of the horizontal stake with respect to the edge restraint.

Figure 21:
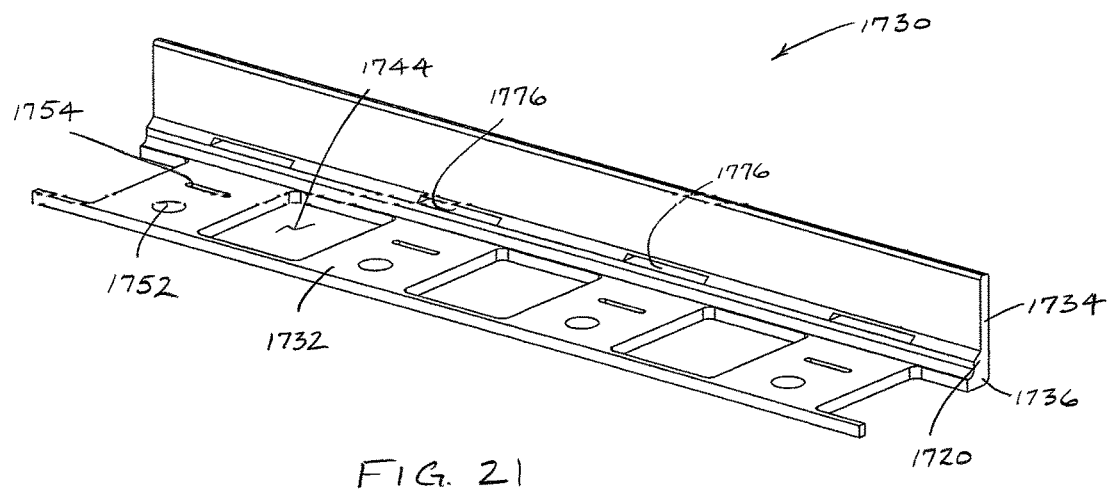
FIGS. 21 and 22 depict alternative embodiments of edge restraints for an edging system similar to the edging systems mentioned above.

FIG. 21 depicts an edge restraint 1730 similar in configuration to the edge restraint shown in FIG. 8, except for the addition of a thickened section 1720 provided on the horizontal section 1732 and/or the vertical section 1734 adjacent to corner 1736. The thickened section 1720 runs along the length (greatest dimension) of the edge restraint 1730. A plurality of slots 1776 are formed through the thickened section 1720. The thickened section 1720 increases the structural rigidity of the vertical section 1734 to inhibit pivotal movement of the vertical section 1734 with respect to the horizontal section 1732 about the corner 1736. In contrast to the thickened section 682 depicted in FIG. 12, which is interrupted between adjacent slots 676, the thickened section 1720 in the embodiment depicted in FIG. 21 is continuous between adjacent slots 1776. As such, the edge restraint 1730 can be an extruded component, for example made of aluminum or plastic, where the voids 1744, the fastener openings 1752, 1754 and the slots 1776 can be punched out of the extrusion.

Figure 22:
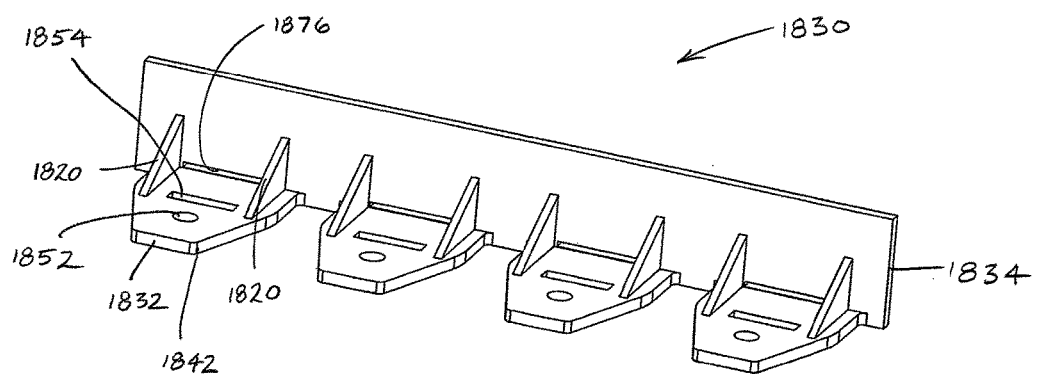

FIG. 22 depicts an edge restraint 1830 similar in configuration to the edge restraint 1430 depicted in FIG. 18; however, with the addition of gussets 1820 connecting a horizontal section 1832 to a vertical section 1834. The horizontal section 1832 is made of a plurality of anchoring sections 1842 each including fastener openings 1852, 1854. The gussets 1820 increase the structural rigidity of the edge restraint 1830 to inhibit pivotal movement of the vertical section 1834 with respect to the horizontal section 1832 about the corner 1836. Each anchoring section 1842 includes two gussets 1820: one gusset on each lengthwise (longest dimension) end of a respective slot 1876, which receives a horizontal stake such as the horizontal stake 1440 depicted in FIG. 20 or the horizontal stakes described above. The gussets 1820 on each anchoring section 1842 are spaced in a lengthwise direction slightly larger than the width of the horizontal stake, which is measured in a perpendicular direction to the central axis 188a depicted in FIG. 5A. As such, the gussets 1820 provide a locating feature to facilitate location of the horizontal stake.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of installing an edging system for a unit pavement system, the method comprising:
   positioning a paver-contacting surface of an edge restraint against an edge of a unit pavement system including a plurality of paver units, wherein the edge restraint includes a horizontal section and a vertical section joined at a corner, the vertical section defining the paver-contacting surface and extending upwardly from and generally perpendicular to the horizontal section; and
   driving a stake underneath at least one paver unit of the plurality of paver units and into a granular material layer upon which the unit pavement system is supported such that the stake is operatively connected with the edge restraint and a main body section, which is flat and thin in a vertical direction, of the stake is disposed at an angle with respect to the horizontal section that is closer to parallel with the horizontal section as compared to perpendicular with the horizontal section such that the main body section is confined within the granular material layer, which overlays a larger aggregate layer or compacted or virgin earth.

2. The method of claim 1, wherein driving the stake further includes driving the stake through a slot in the vertical section of the edge restraint.

3. The method of claim 1, wherein driving the stake further includes driving the stake underneath the horizontal section of the edge restraint.

4. The method of claim 1, wherein driving the stake further includes driving the stake through a slot in the vertical section of the edge restraint positioned adjacent to and offset vertically above the corner.

5. The method of claim 4, wherein driving the stake through the slot in the vertical section of the edge restraint further includes driving the stake through the slot until the stake frictionally engages the edge restraint around the slot.

6. The method of claim 4, wherein the stake includes an upwardly extending tab at a first end of the stake, wherein the tab is perpendicular to a main body section of the stake, wherein driving the stake through the slot in the vertical section of the edge restraint further includes driving the stake through the slot until the upwardly extending tab is positioned adjacent to the vertical section of the edge restraint.

7. The method of claim 1, further comprising driving a fastener into the granular material or ground adjacent the granular material through a fastener opening in the horizontal section such that the fastener is oriented closer to parallel with the vertical section as compared to perpendicular to the vertical section.

8. An edging system for a unit pavement system comprising:
    an edge restraint including a horizontal section and a vertical section joined at a corner, the vertical section extending upwardly from and generally perpendicular to the horizontal section to an upper edge, and the vertical section also defining a paver-contacting surface configured to contact an edge of the unit pavement system; and
    a stake configured to operatively connect with the edge restraint, wherein the stake is sufficiently rigid so as to be driven into coarse sand with a hammer underneath paver units of the unit pavement system, wherein the stake includes a flat and thin, in a vertical direction, main body section extending away from the paver-contacting surface of the edge restraint in a direction that is closer to parallel with the horizontal section as compared to perpendicular to the horizontal section;
    wherein the vertical section includes a slot that receives the stake, wherein the slot is positioned nearer to the corner as compared to the upper edge, wherein the stake is sized and shaped to correspond to and be received within the slot so as to limit an end of the stake driven underneath the unit pavement system from passing vertically beneath a lower surface of the edge restraint.

9. The edging system of claim 8, wherein the stake further includes a tab configured to engage the edge restraint to inhibit movement of the stake with respect to the edge restraint.

10. The edging system of claim 9, wherein the tab extends vertically upward or downward from a main body section of the stake.

11. The edging system of claim 9, wherein the edge restraint includes a frame extending from the horizontal section spaced from the vertical section in a first direction, wherein the frame defines an additional slot that receives the stake and the tab contacts the frame.

12. The edging system of claim 8, wherein the stake and the slot are configured such that the stake frictionally engages the vertical section of the edge restraint around the slot when driven a predetermined length through the slot.

13. The edging system of claim 8, wherein the horizontal section includes a plurality of anchoring sections separated by respective voids and the vertical section includes a plurality of slots that are each aligned with a respective anchoring section.

14. The edging system of claim 8, wherein the edge restraint includes a thickened section on the vertical section around each slot.

15. The edging system of claim 8, wherein the edge restraint includes a gusset positioned adjacent each lengthwise end of a respective slot.

16. The edging system of claim 8, further comprising a knockout section provided in each slot.

17. The edging system of claim 8, wherein the horizontal section includes a fastener opening and further comprising a fastener configured to be received in the fastener opening oriented closer to parallel with the vertical section as compared to perpendicular to the vertical section.

18. An edging system for a unit pavement system comprising:
    an edge restraint including a horizontal section and a vertical section joined at a corner, the vertical section extending upwardly from and generally perpendicular to the horizontal section to an upper edge, and the vertical section also defining a paver-contacting surface configured to contact an edge of the unit pavement system, wherein the vertical section includes a slot positioned nearer to the corner as compared to the upper edge of the vertical section; and
    a stake sized and shaped to be received within the slot, wherein the stake is sufficiently rigid so as to be driven into coarse sand or aggregate, wherein the stake includes a substantially horizontally disposed main body section extending away from the paver-contacting surface of the edge restraint, wherein the main body section defines a longitudinal central axis, wherein a width of the slot is wider than the main body section of the stake such that the longitudinal central axis is askew from the vertical section of the edge restraint at an angle other than 90 degrees when viewed from above the edge restraint.

* * * * *